(12) United States Patent
Ogiso et al.

(10) Patent No.: US 8,245,569 B2
(45) Date of Patent: Aug. 21, 2012

(54) ABNORMALITY DETECTION APPARATUS AND ABNORMALITY DETECTION METHOD FOR AIR/FUEL RATIO SENSOR

(75) Inventors: Takeo Ogiso, Toyota (JP); Keiko Okamoto, Toyota (JP); Yuya Yoshikawa, Chiryu (JP); Hiroaki Tsuji, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 329 days.

(21) Appl. No.: 12/775,872

(22) Filed: May 7, 2010

(65) Prior Publication Data

US 2010/0318260 A1    Dec. 16, 2010

(30) Foreign Application Priority Data

Jun. 10, 2009  (JP) ................................. 2009-139349

(51) Int. Cl.
G01M 15/04  (2006.01)
(52) U.S. Cl. .................................................. 73/114.77
(58) Field of Classification Search ............... 73/114.32, 73/114.48, 114.77
See application file for complete search history.

(56) References Cited

U.S. PATENT DOCUMENTS

| | | | | |
|---|---|---|---|---|
| 6,136,169 A * | 10/2000 | Okamoto | ...................... | 204/401 |
| 7,293,557 B2 * | 11/2007 | Nakamura et al. | ............ | 123/688 |
| 2008/0154528 A1 * | 6/2008 | Iwazaki | ........................ | 702/100 |
| 2008/0189008 A1 * | 8/2008 | Iwazaki | .......................... | 701/29 |
| 2010/0186491 A1 * | 7/2010 | Shibata et al. | ............. | 73/114.72 |
| 2010/0318282 A1 * | 12/2010 | Ogiso et al. | .................... | 701/109 |
| 2010/0319667 A1 * | 12/2010 | Yoshikawa et al. | ........... | 123/690 |
| 2010/0324802 A1 * | 12/2010 | Ogiso et al. | ................... | 701/103 |

FOREIGN PATENT DOCUMENTS

| | | |
|---|---|---|
| JP | A-8-121152 | 5/1996 |
| JP | A-8-246854 | 9/1996 |
| JP | A-2004-225684 | 8/2004 |
| JP | A-2005-307961 | 11/2005 |
| JP | A-2006-57587 | 3/2006 |
| JP | A-2007-270745 | 10/2007 |
| JP | A-2008-14234 | 1/2008 |

* cited by examiner

*Primary Examiner* — Eric S McCall
(74) *Attorney, Agent, or Firm* — Oliff & Berridge, PLC

(57) ABSTRACT

An abnormality detection apparatus includes: an air/fuel ratio control portion that controls of fluctuating the air/fuel ratio; a data acquisition portion that acquires a responsiveness parameter during change of output of the sensor between rich and lean peaks; and a abnormality determination portion that when the number of acquisitions reaches or exceeds a first set number, the presence/absence of sensor abnormality based on the average value and the criterion-value is determined, if the average value is not in a pending region; however, if the average value is in the pending region, the data acquisition is performed until the number of acquisitions performed during a large-amount-of-intake-air state of the engine reaches a second set number, and the presence/absence of sensor abnormality based on the average value of the data acquired by the second set number of acquisitions and the criterion-value is determined.

7 Claims, 10 Drawing Sheets

ABNORMALITY DETECTION APPARATUS AND ABNORMALITY DETECTION METHOD FOR AIR/FUEL RATIO SENSOR

INCORPORATION BY REFERENCE

The disclosure of Japanese Patent Application No. 2009-139349 filed on Jun. 10, 2009 including the specification, drawings and abstract is incorporated herein by reference in its entirety.

BACKGROUND OF THE INVENTION

1. Field of the Invention

The invention relates to an abnormality detection apparatus and an abnormality detection method for an air/fuel ratio sensor.

2. Description of the Related Art

An internal combustion engine for a motor vehicle or the like is provided with an air/fuel ratio sensor that outputs a signal that corresponds to the air/fuel ratio of the internal combustion engine on the basis of the oxygen concentration in exhaust gas. On the basis of the output from the air/fuel ratio sensor, the amount of fuel injected into the engine is corrected to so that the air/fuel ratio of the engine becomes equal to a stoichiometric air/fuel ratio. By controlling the air/fuel ratio of the internal combustion engine to the stoichiometric air/fuel ratio through the correction of the amount of fuel injection, good performance of exhaust purification of an exhaust purification catalyst provided in an exhaust system of the engine is maintained so that the exhaust emission of the internal combustion engine can be bettered.

With the foregoing internal combustion engine, there is a risk that abnormality of the air/fuel ratio sensor, such as degradation thereof or the like, may influence the exhaust emission. Therefore, in order to prevent such influence, the engine is provided with an abnormality detection apparatus that determines the presence/absence of abnormality of the air/fuel ratio sensor. A known abnormality detection apparatus of this kind determines the presence/absence of abnormality of an air/fuel ratio sensor by the following procedure "1" to "3" as shown in, for example, Japanese Patent Application Publication No. 2008-14234 (JP-A-2008-14234). Firstly, as the process "1" in the procedure, an active air/fuel ratio control in which the air/fuel ratio of the internal combustion engine is periodically fluctuated between a rich state and a lean state is performed. Next, as the process "2", a parameter that corresponds to the responsiveness of the output of the air/fuel ratio sensor is found on the basis of the output of the sensor during the active air/fuel ratio control, and the parameter is acquired as data for detecting abnormality. Finally, as the process "3", the presence/absence of abnormality of the air/fuel ratio sensor is determined on the basis of comparison between the acquired data and an abnormality criterion value.

Incidentally, with regard to the processes "2" and "3", in order to more accurately perform the determination as to the presence/absence of abnormality of the air/fuel ratio sensor, it is also possible to adopt a modification in which the foregoing acquisition of data is performed a plurality of times, and the presence/absence of abnormality of the air/fuel ratio sensor is determined on the basis of comparison between an average value of the data acquired by the plurality of acquisitions and an abnormality criterion value.

By the way, in recent years, the requirement for betterment of exhaust emission of the internal combustion engine has become severer. If an air/fuel ratio sensor that does not meet the requirement is considered as being abnormal, the responsiveness parameter found in the process "2" represents less clearly a difference made by the presence/absence of abnormality of the air/fuel ratio sensor. In particular, during the state of small amount of intake air of the internal combustion engine, since the exhaust gas pressure of the internal combustion engine (that corresponds to the amount of flow of exhaust gas) becomes low so that the influence caused by abnormality of the air/fuel ratio sensor, such as degradation thereof or the like, does not clearly appear in the output of the air/fuel ratio sensor, the foregoing tendency of the responsiveness parameter representing less clearly the difference made by the presence/absence of abnormality of the air/fuel ratio sensor becomes conspicuous. Furthermore, when the motor vehicle is accelerating or decelerating during the small-amount-of-intake-air state of the internal combustion engine, the responsiveness parameter greatly fluctuates due to the response delay of various appliances of the internal combustion engine, so that there is high possibility that data acquired in the process "2" will have a value that makes it hard to determine the presence/absence of abnormality of the air/fuel ratio sensor.

Therefore, JP-A-2008-14234 proposes that a condition that the internal combustion engine be in a state of large amount of intake air is set as an execution condition for performing the determination as to the presence/absence of abnormality regarding the output of an air/fuel ratio sensor. During the large-amount-of-intake-air state of the internal combustion engine, the exhaust gas pressure of the internal combustion engine (corresponding to the amount of flow of exhaust gas) rises, and influence of abnormality of the air/fuel ratio sensor, such as degradation thereof, or the like, appears clearly in the output of the air/fuel ratio sensor, so that the responsiveness parameter found in the process "2" is more likely to represent a difference made by the presence/absence of abnormality of the air/fuel ratio sensor. Therefore, if the condition that the internal combustion engine be in the large-amount-of-intake-air state as an execution condition for performing the determination as to the presence/absence of abnormality of the air/fuel ratio sensor on the basis of the procedure "1" to "3", it becomes possible to accurately perform the determination as to the presence/absence of abnormality.

By setting the condition that the internal combustion engine be in the large-amount-of-intake-air state as an execution condition for performing the determination as to the presence/absence of abnormality of the air/fuel ratio sensor, it becomes possible to accurately perform the determination as to the presence/absence of abnormality of the air/fuel ratio sensor. However, it is inevitable that the opportunities of executing the determination as to the presence/absence of abnormality of the air/fuel ratio sensor on the basis of the procedure "1" to "3" decrease by an amount that corresponds to the setting of that condition.

SUMMARY OF THE INVENTION

The invention provides an abnormality detection apparatus and an abnormality detection method for an air/fuel ratio sensor which is capable of restraining the reduction of the opportunity of executing the determination as to the presence/absence of abnormality of the air/fuel ratio sensor while accurately performing the determination as to the presence/absence of abnormality.

An abnormality detection apparatus for an air/fuel ratio sensor in accordance with a first aspect of the invention is an abnormality detection apparatus for an air/fuel ratio sensor that outputs a signal that corresponds to air/fuel ratio of an internal combustion engine based on oxygen concentration in exhaust gas of the internal combustion engine, the apparatus including: an air/fuel ratio control portion that performs an active air/fuel ratio control of periodically fluctuating the air/fuel ratio of the internal combustion engine between a rich state and a lean state; a data acquisition portion that acquires, as data for detecting abnormality, a parameter that corresponds to responsiveness during change of output of the air/fuel ratio sensor between a rich peak and a lean peak during the active air/fuel ratio control performed by the air/fuel ratio control portion; and an abnormality determination portion that when the number of acquisitions performed by the data acquisition portion becomes equal to or greater than a first set number, if the average value of the data acquired is not in a pending region wherein a difference made by the presence/absence of abnormality of the air/fuel ratio sensor is less likely to appear in the parameter, the abnormality determination portion determines the presence/absence of abnormality of the air/fuel ratio sensor based on comparison between the average value and an abnormality criterion value, and when the number of acquisitions performed by the data acquisition portion becomes equal to or greater than the first set number, if the average value of the data acquired is in the pending region, the acquisition of the data is performed by the data acquisition portion until the number of acquisitions of the data performed when intake air amount of the internal combustion engine is large reaches a second set number, and the abnormality determination portion determines the presence/absence of abnormality of the air/fuel ratio sensor based on comparison between the average value of the data acquired by the second set number of acquisitions and the abnormality criterion value.

According to the abnormality detection apparatus for an air/fuel ratio sensor in accordance with the first aspect, the determination as to the presence/absence of abnormality of the air/fuel ratio sensor is performed in the following procedure. That is, the active air/fuel ratio control is performed. When the output of the air/fuel ratio sensor changes between the rich peak and the lean peak during the active air/fuel ratio control, a parameter that corresponds to the responsiveness of the change is found on the basis of the output, and is acquired as data for use for detecting abnormality. Then, when the number of acquisitions of data becomes greater than or equal to the first set number, the average value of the data acquired. If the average value is not in the pending region, the presence/absence of abnormality of the air/fuel ratio sensor is determined on the basis of comparison between the average value of the data and the abnormality criterion value. Incidentally, the foregoing pending region is a region in which the difference made by the presence/absence of abnormality of the air/fuel ratio sensor is less likely to appear in the responsiveness parameter. Therefore, when the average value of the data is not in the pending region, it is possible to accurately perform the determination as to the presence/absence of abnormality of the air/fuel ratio sensor on the basis of comparison between the average value and the abnormality criterion value. In this case, as described above, when the number of acquisitions of data reaches the first set number, the determination as to the presence/absence of abnormality of the air/fuel ratio sensor based on comparison between the average value of data and the abnormality criterion value is promptly performed. Therefore, the determination as to the presence/absence of abnormality can be performed earlier, and the decrease of the opportunities of executing the determination can be restrained. Furthermore, in conjunction with the execution of the determination as to the presence/absence of abnormality of the air/fuel ratio sensor based on the foregoing procedure, a condition that the internal combustion engine be in the large-amount-of-intake-air state, or the like is not set as an execution condition for executing the determination. Therefore, the decrease of the opportunities of executing the determination as to the presence/absence of abnormality of the air/fuel ratio sensor by an amount of decrease that corresponds to the setting of that condition can be restrained.

On the other hand, if the average value of the data acquired is in the pending region when the number of acquisitions of the data reaches the first set number, the acquisition of data is continued until the number of acquisitions of the data performed when the intake air amount of the internal combustion engine is large reaches the second set number. Then, the presence/absence of abnormality of the air/fuel ratio sensor is determined on the basis of comparison between the average value of the data acquired by the second set number of acquisitions and the abnormality criterion value. Incidentally, the data acquired during the large-amount-of-intake-air state of the internal combustion engine is highly reliable data that precisely represents the influence of occurrence of abnormality of the air/fuel ratio sensor if any occurs. This is because during the large-amount-of-intake-air state of the internal combustion engine, the amount of flow of exhaust gas also becomes large due to the large amount of intake air, and because the influence of the abnormality of the air/fuel ratio sensor more easily appears in the output of the air/fuel ratio sensor. Since the average value is found using the highly reliable data, the determination as to the presence/absence of abnormality of the air/fuel ratio sensor based on comparison between the average value and the abnormality criterion value becomes accurate. However, with regard to execution of the determination as to the presence/absence of abnormality of the air/fuel ratio sensor, it is a required condition that the number of acquisitions of data performed when the amount of intake air of the internal combustion engine is large be greater than or equal to the second set number. Although this condition is an execution condition for executing the determination as to the presence/absence of abnormality of the air/fuel ratio sensor, the opportunities of executing the determination in this case increase, in comparison with the case where the determination as to the presence/absence of abnormality of the air/fuel ratio sensor is executed by using, as an execution condition, the condition that the internal combustion engine be in the large-amount-of-intake-air state, or the like. Furthermore, the occasion when the condition that the number of acquisitions performed when the intake air amount of the internal combustion engine is large be greater than or equal to the second set number is used as a condition for executing the determination as to the presence/absence of abnormality of the air/fuel ratio sensor is limited to when the average value of the data of each kind that is found when the number of acquisitions of data reaches the first set number is in the pending region. Therefore, the decrease of the opportunities of executing the determination as to the presence/absence of abnormality of the air/fuel ratio sensor by an amount of decrease that corresponds to the foregoing condition can be minimized.

Due to what has been described above, it becomes possible to restrain the decrease of the opportunities of executing the determination while accurately performing the determination as to the presence/absence of abnormality of the air/fuel ratio sensor.

An abnormality detection method for an air/fuel ratio sensor in accordance with a second aspect of the invention is an abnormality detection method for an air/fuel ratio sensor that outputs a signal that corresponds to air/fuel ratio of an internal combustion engine based on oxygen concentration in exhaust gas of the internal combustion engine, the method including: performing an active air/fuel ratio control of periodically fluctuating the air/fuel ratio of the internal combustion engine between a rich state and a lean state; acquiring, as data for detecting abnormality, a parameter that corresponds to responsiveness during change of output of the air/fuel ratio sensor between a rich peak and a lean peak during the active air/fuel ratio control performed; and determining presence/absence of abnormality of the air/fuel ratio sensor based on comparison between an average value of the data and an abnormality criterion value, when the number of acquisitions of the data performed becomes equal to or greater than a first set number, if the average value is not in a pending region wherein a difference made by the presence/absence of abnormality of the air/fuel ratio sensor is less likely to appear in the parameter; and performing the acquisition of the data until the number of acquisitions of the data performed when intake air amount of the internal combustion engine is large reaches a second set number, and determining the presence/absence of abnormality of the air/fuel ratio sensor based on comparison between the average value of the data acquired by the second set number of acquisitions and the abnormality criterion value, when the number of acquisitions of the data performed becomes equal to or greater than the first set number, if the average value is in the pending region.

The abnormality detection method for an air/fuel ratio sensor in accordance with the second aspect of the invention achieves substantially the same effect as the abnormality detection apparatus for an air/fuel ratio sensor in accordance with the first aspect.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Figure 1:
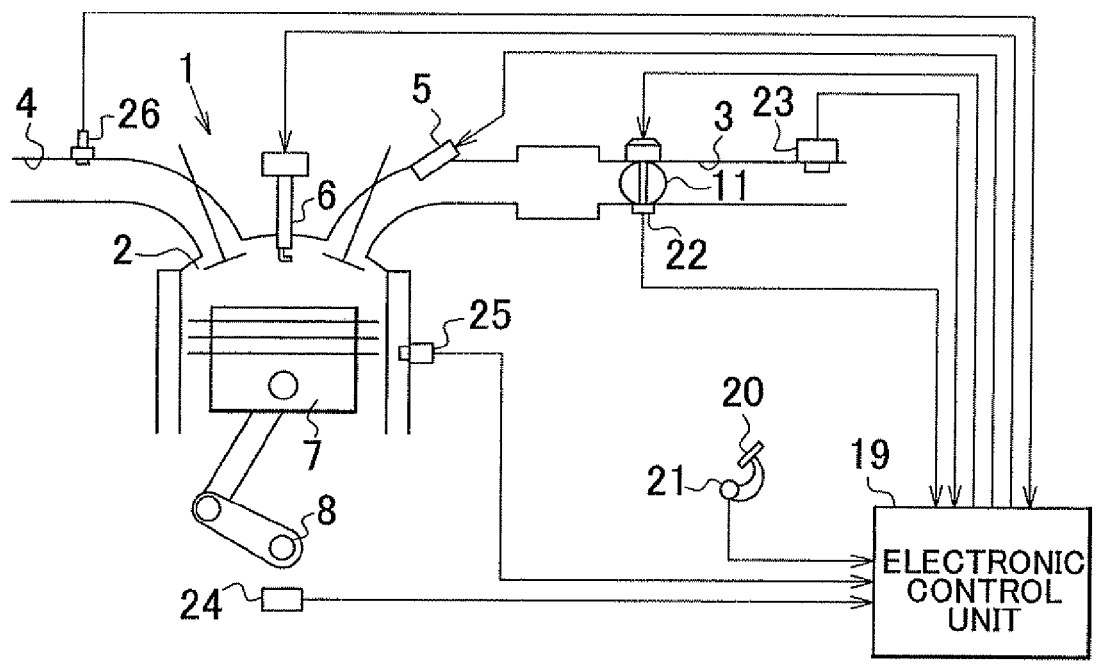
FIG. 1 is a simplified diagram showing the entire engine to which an abnormality detection apparatus for an air/fuel ratio sensor in accordance with embodiments of the invention.

Hereinafter, an embodiment in which the invention is embodied in an abnormality detection apparatus for an air/fuel ratio sensor provided in a motor vehicle engine will be described with reference to FIG. 1 to FIG. 10. In an engine 1 shown in FIG. 1, an intake passageway 3 and an exhaust passageway 4 are connected to a combustion chamber 2 of each cylinder. The combustion chamber 2 of each cylinder is charged with a mixture made of air and fuel as air is taken into the combustion chamber 2 via the intake passageway 3 that is provided with a throttle valve 11 for adjusting the amount of intake air of the engine 1 and the fuel is supplied into the intake passageway 3 by injection from a fuel injection valve 5. When the mixture burns on the basis of ignition by an ignition plug 6 of each cylinder, the combustion energy produced at that time moves a piston 7 back and forth, so that a crankshaft 8 that is the output shaft of the engine 1 is rotated. Besides, the post-combustion mixture is sent out as exhaust gas into the exhaust passageway 4.

The motor vehicle in which the engine 1 is mounted as a prime mover is provided with an electronic control unit (ECU) 19 that executes various controls such as an operation control of the engine 1, etc. This electronic control unit 19 includes a CPU that executes various computations and processes related to the various controls, a ROM that stores programs and data needed for the controls, a RAM that temporarily stores results of the computations performed by the CPU, and the like, input/output ports for inputting signals from and outputting signals to external devices, etc.

Various sensors and the like as mentioned below are connected to the input ports of the electronic control unit 19. The various sensors include an accelerator pedal position sensor 21 that detects the amount of depression of an accelerator pedal 20 that is depressed by a driver of the motor vehicle (accelerator pedal depression amount), a throttle position sensor 22 that detects the degree of opening of the throttle valve 11 provided in the intake passageway 3 of the engine 1 (throttle opening degree), an air flow meter 23 that detects the amount of air (intake air amount) taken into the combustion chamber 2 of each cylinder through the intake passageway 3, a crank position sensor 24 that outputs a signal that corresponds to the rotation of the crankshaft 8, a water temperature sensor 25 that detects the cooling water temperature of the engine 1, and an air/fuel ratio sensor 26 that is provided in the exhaust passageway 4 and outputs a signal commensurate with the oxygen concentration in exhaust gas of the engine 1.

Besides, the drive circuits of various appliances, such as the fuel injection valves 5, the ignition plugs 6, the throttle valve 11, etc., are connected to the output ports of the electronic control unit 19.

The electronic control unit 19 outputs command signals to the drive circuits of the various appliances connected to the output ports, according to the state of operation of the engine 1 that is grasped by the detection signals input from the various sensors. In this manner, the electronic control unit 19 executes various controls such as an ignition timing control of the ignition plugs 6, an opening degree control of the throttle valve 11, a control of the fuel injection via the fuel injection valves 5, etc.

An example of the control of the fuel injection via the fuel injection valves 5 is a fuel injection amount control that includes air/fuel ratio feedback correction of the amount of fuel injection. The air/fuel ratio feedback correction of the fuel injection amount is realized by increasing or decreasing an air/fuel ratio feedback correction value FD for correcting the fuel injection amount on the basis of the output VAF of the air/fuel ratio sensor 26 and the like so that the air/fuel ratio of the engine 1 becomes equal to a stoichiometric air/fuel ratio, and then by performing the correction with the air/fuel ratio feedback correction value FD. By controlling the air/fuel ratio of the engine 1 to the stoichiometric air/fuel ratio through the air/fuel ratio feedback correction, it becomes possible to maintain good performance of exhaust purification of exhaust purification catalysts provided in the exhaust passageway 4 of the engine 1 and therefore better the exhaust emission of the engine 1.

Figure 2:
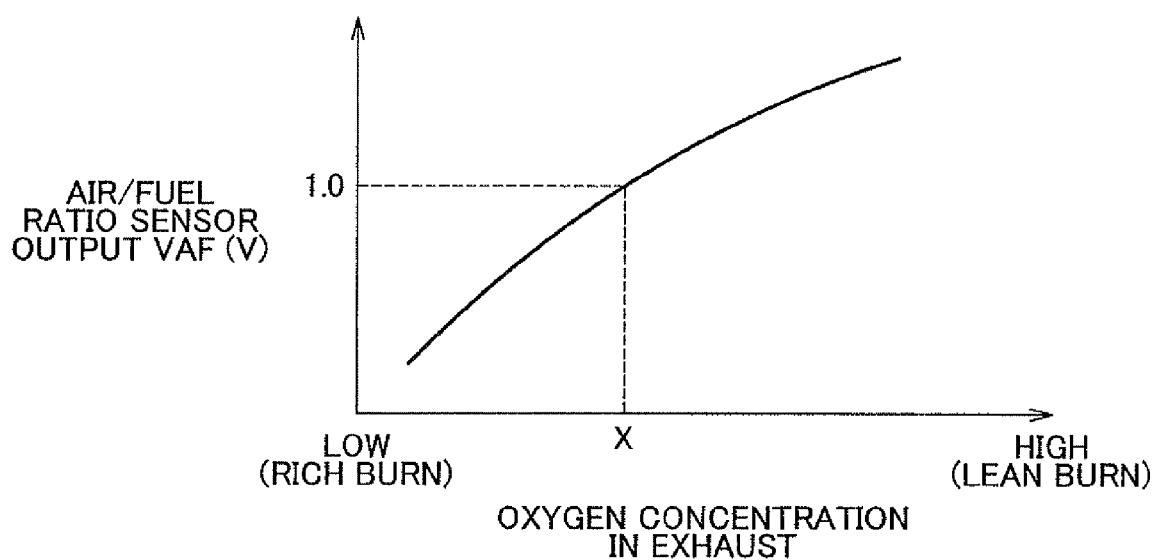
FIG. 2 is a graph showing changes of the output of the air/fuel ratio sensor relative to changes in the oxygen concentration in exhaust gas in embodiments of the invention.

The output VAF of the air/fuel ratio sensor 26 becomes smaller the lower the oxygen concentration in exhaust gas becomes, as shown in FIG. 2. When the mixture is burned at the stoichiometric air/fuel ratio, the output VAF of the air/fuel ratio sensor 26 becomes, for example, "1.0 V", corresponding to the then oxygen concentration X in exhaust gas. Therefore, the lower the oxygen concentration in exhaust gas becomes due to combustion of rich mixture (rich combustion), the smaller the output VAF of the air/fuel ratio sensor 26 becomes in the range below "1.0 V". Besides, the higher the oxygen concentration in exhaust gas becomes due to combustion of lean mixture (lean combustion), the greater the output VAF of the air/fuel ratio sensor 26 becomes in the range above "1.0 V". Then, as the output VAF of the air/fuel ratio sensor 26 becomes greater in the range above "1.0", the air/fuel ratio feedback correction value FD is gradually increased so as to increase the amount of fuel injection of the engine 1. Besides, as the output VAF of the air/fuel ratio sensor 26 becomes smaller in the range below "1.0", the air/fuel ratio feedback correction value FD is gradually reduced so as to reduce the amount of fuel injection of the engine 1. By correcting the amount of fuel injection of the engine 1 in the increasing or decreasing direction on the basis of the air/fuel ratio feedback correction value FD that changes in the foregoing manner, the air/fuel ratio of the engine 1 is controlled to the stoichiometric air/fuel ratio.

Next, an abnormality detection process for determining the presence/absence of abnormality of the air/fuel ratio sensor 26, such as degradation thereof or the like, which is performed via the electronic control unit 19 will be described. This abnormality detection process is performed by the following procedure "a" to "c".

Figure 3:
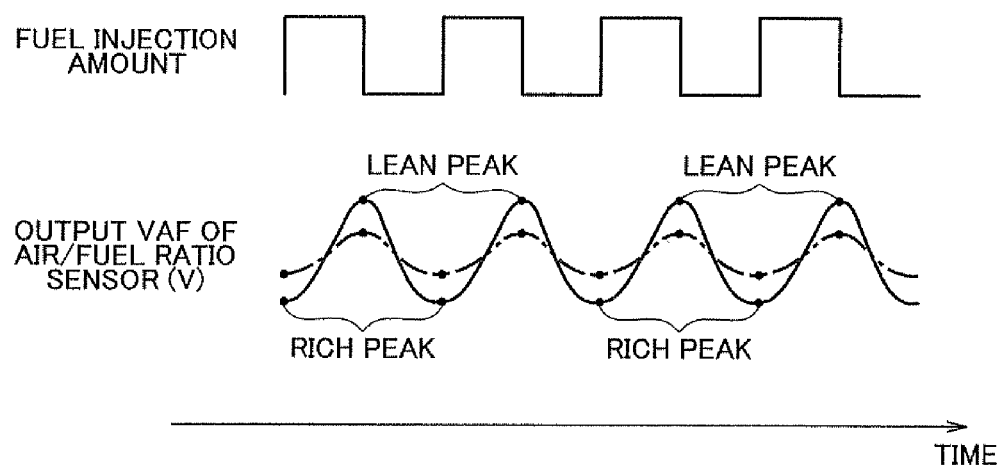
FIG. 3 is a time chart showing the fashion of increases and decreases of the amount of fuel injection during the active air/fuel ratio control, and the fashion of changes of the output of the air/fuel ratio sensor in embodiments of the invention.

Firstly, in the process "a", an active air/fuel ratio control of periodically fluctuating the air/fuel ratio of the engine 1 between a rich state in which the air/fuel ratio is richer than the stoichiometric air/fuel ratio and a lean state in which the air/fuel ratio is leaner than the stoichiometric air/fuel ratio by periodically increasing and decreasing the amount of fuel injection of the engine 1 as shown, for example, in FIG. 3, is performed. Incidentally, the amount of change of the air/fuel ratio relative to the stoichiometric air/fuel ratio when the air/fuel ratio of the engine 1 is fluctuated by the active air/fuel ratio control is set at, for example, about 3% of the stoichiometric air/fuel ratio to the rich side and the lean side from the stoichiometric air/fuel ratio.

Next, in the process "b", a parameter that corresponds to the responsiveness of the output of the air/fuel ratio sensor 26 (hereinafter, referred to as "responsiveness parameter") during the active air/fuel ratio control is found on the basis of the output VAF of the air/fuel ratio sensor 26 during the active air/fuel ratio control, and the parameter is acquired as data for detecting abnormality. Incidentally, the acquisition of data in this manner is able to be repeatedly performed, and therefore the acquisition of data as described above is able to be performed a plurality of times to acquire a plurality of data.

Finally, in the process "c", the presence/absence of abnormality of the air/fuel ratio sensor 26 is determined on the basis of comparison between the average value of the acquired data and an abnormality criterion value. Due to this manner of the determination as to the presence/absence of abnormality of the air/fuel ratio sensor 26 through the use of the average value, even if there is variation among the plurality of data due to variations of the operation of the engine 1, the influence of the variation on the determination as to the presence/absence of abnormality is restrained.

By the way, as stated above in conjunction with the related art, in recent years, the requirement for better exhaust emission of the engine 1 has become severer. If an air/fuel ratio sensor 26 that does not meet the requirement is considered as being abnormal, the responsiveness parameter found in the process "b" less clearly represents a difference made by the presence/absence of abnormality of the air/fuel ratio sensor 26. In particular, during the small-amount-of-intake-air state of the engine 1, the exhaust gas pressure of the engine 1 (that corresponds to the amount of flow of exhaust gas) declines, and the influence caused by abnormality of the air/fuel ratio sensor 26, such as degradation or the like, comes to less clearly appear in the output VAF of the air/fuel ratio sensor 26, the foregoing tendency of the responsiveness parameters representing less clearly the difference made by the presence/absence of abnormality of the air/fuel ratio sensor becomes conspicuous.

When the engine 1 is in the large-amount-of-intake-air state, conversely to when the engine 1 is in the small-amount-of-intake-air state, the exhaust gas pressure of the engine 1 (corresponding to the amount of flow of exhaust gas) rises, and the influence of abnormality of the air/fuel ratio sensor, such as degradation thereof or the like, comes to more clearly appear in the output of the air/fuel ratio sensor, so that the responsiveness parameter found in the process "b" becomes more likely to represent a difference made by the presence/absence of abnormality of the air/fuel ratio sensor 26. Therefore, if the condition that the engine 1 is in the large-amount-of-intake-air state is set as an execution condition for performing the determination as to the presence/absence of abnormality in the engine 1 on the basis of the procedure "a" to "c", it becomes possible to accurately perform the determination as to the presence/absence of abnormality. However, it is inevitable that the opportunity of executing the determination as to the presence/absence of abnormality of the air/fuel ratio sensor on the basis of the procedure "a" to "c" decreases corresponding to the setting of that condition.

Figure 4:
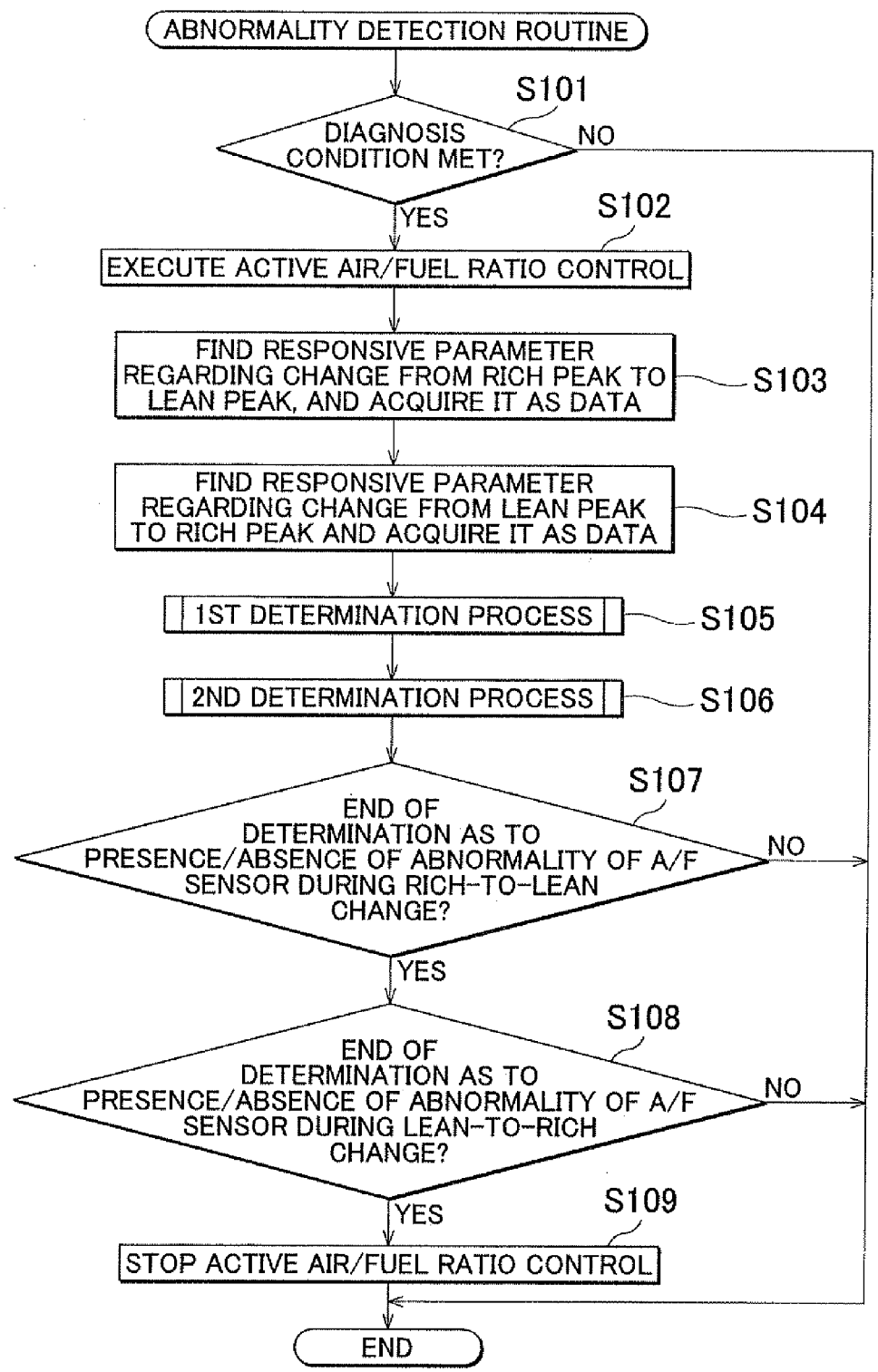
FIG. 4 is a flowchart showing an execution procedure of an abnormality detection process for determining the presence/absence of abnormality of the air/fuel ratio sensor in embodiments of the invention.

FIG. 4 is a flowchart showing an abnormality detection process routine for executing the abnormality detection process of this embodiment that is intended to cope with the foregoing drawbacks. Through the execution of this abnormality detection process, the determination as to the presence/absence of abnormality of the air/fuel ratio sensor 26 is accurately performed, and the foregoing drawback of decrease of the opportunities of executing the determination process is mitigated. This abnormality detection process routine is periodically executed by, for example, a time interrupt at every predetermined time, via the electronic control unit 19. Incidentally, in the abnormality detection process routine, the process of steps S101 and S102 corresponds to the process "a", and the process of steps S103 and S104 corresponds to the process "b", and the process of steps S105 to S109 corresponds to the process "c".

The procedure of the processes "a" to "c" related to the abnormality detection process of this embodiment will be described in detail below. Firstly, the process "a" (S101 and S102) will be described. In the process of step S101, firstly, it is determined whether or not a diagnosis condition that is a prerequisite condition for executing the abnormality detection process that includes an active air/fuel ratio control has been satisfied. The determination that the diagnosis condition has been satisfied is made upon satisfaction of the conditions that, for example, the cooling water temperature, the engine rotation speed, the engine load, the fluctuation of the air/fuel ratio, the amount of intake air (intake air amount), the fluctuation of the intake air amount, etc. of the engine 1 are all within regions that allow the abnormality detection process to be executed. Incidentally, the engine rotation speed is found on the basis of a detection signal from the crank position sensor 24. Besides, the engine load is calculated from a parameter that corresponds to the intake air amount of the engine 1, and the engine rotation speed. Examples of the parameter corresponding to the intake air amount which is used herein include an actually measured value of the intake air amount of the engine 1 which is found on the basis of the detection signal from the air flow meter 23, the degree of throttle opening detected by the throttle position sensor 22, etc. If in step S101 it is determined that the diagnosis condition has been satisfied, the foregoing active air/fuel ratio control is executed (S102).

Next, the process "b" (S103 and S104) will be described. In the process of step S103, a responsiveness parameter for the period during which the output VAF of the air/fuel ratio sensor 26 changes from a rich peak to a lean peak during the active air/fuel ratio control is found, and the found responsiveness parameter is acquired as data. On the other hand, in the process of step S104, a responsiveness parameter for the period during which the output VAF of the air/fuel ratio sensor 26 changes from a lean peak to a rich peak during the active air/fuel ratio control is found, and the found responsiveness parameter is acquired as data.

The responsiveness parameter used herein may be a maximum value θmax of the gradient θ of the output VAF of the air/fuel ratio sensor 26 while the output VAF of the air/fuel ratio sensor 26 changes between the rich peak and the lean peak. The gradient θ of the output VAF of the air/fuel ratio sensor 26 is a value that represents change of the output VAF of the air/fuel ratio sensor 26 per unit time, and is calculated in the following manner. That is, the output VAF of the air/fuel ratio sensor is taken at every predetermined time interval Δt during the period of the change between the rich peak and the lean peak, and at every one of such take-up, the gradient θ is calculated using the following expression.

$$\theta = (\text{present } VAF - \text{previous } VAF)/\Delta t \quad (1)$$

Hence, when the change of the output VAF of the air/fuel ratio sensor 26 from the rich peak to the lean peak is completed, the then maximum value θmax (maximum value in a positive direction) of the gradient θ of the output VAF of the air/fuel ratio sensor 26 during the time from the rich peak to the lean peak is determined. Then, the maximum value θmax of the gradient θ of the output VAF of the air/fuel ratio sensor 26 is acquired as data that corresponds to the responsiveness parameter used for the time from the rich peak to the lean peak (S103). More specifically, the maximum value θmax of the gradient θ of the output VAF of the air/fuel ratio sensor 26 is stored into the RAM of the electronic control unit 19. Furthermore, the intake air amount of the engine 1 at the time of the foregoing data acquisition is also stored into the RAM of the electronic control unit 19, as information that is related to the data. This storage of the maximum value θmax and the intake air amount is performed every time the change of the output VAF of the air/fuel ratio sensor 26 from the rich peak to the lean peak is completed during the active air/fuel ratio control.

Besides, when the change of the output VAF of the air/fuel ratio sensor 26 from the lean peak to the rich peak is completed, the maximum value θmax (maximum value in the negative direction) of the gradient θ of the output VAF of the air/fuel ratio sensor 26 during the time from the lean peak to the rich peak is determined. Then, the maximum value θmax of the gradient θ of the output VAF of the air/fuel ratio sensor 26 is acquired as data that corresponds to the responsiveness parameter used for the time from the lean peak to the rich peak (S104). More specifically, the maximum value θmax of the gradient θ of the output VAF of the air/fuel ratio sensor 26 is stored into the RAM of the electronic control unit 19. Furthermore, the intake air amount of the engine 1 at the time of the foregoing data acquisition is also stored into the RAM of the electronic control unit 19, as information that is related to the data. This storage of the maximum value θmax and the intake air amount is performed every time the change of the output VAF of the air/fuel ratio sensor 26 from the lean peak to the rich peak is completed during the active air/fuel ratio control.

Figure 5:
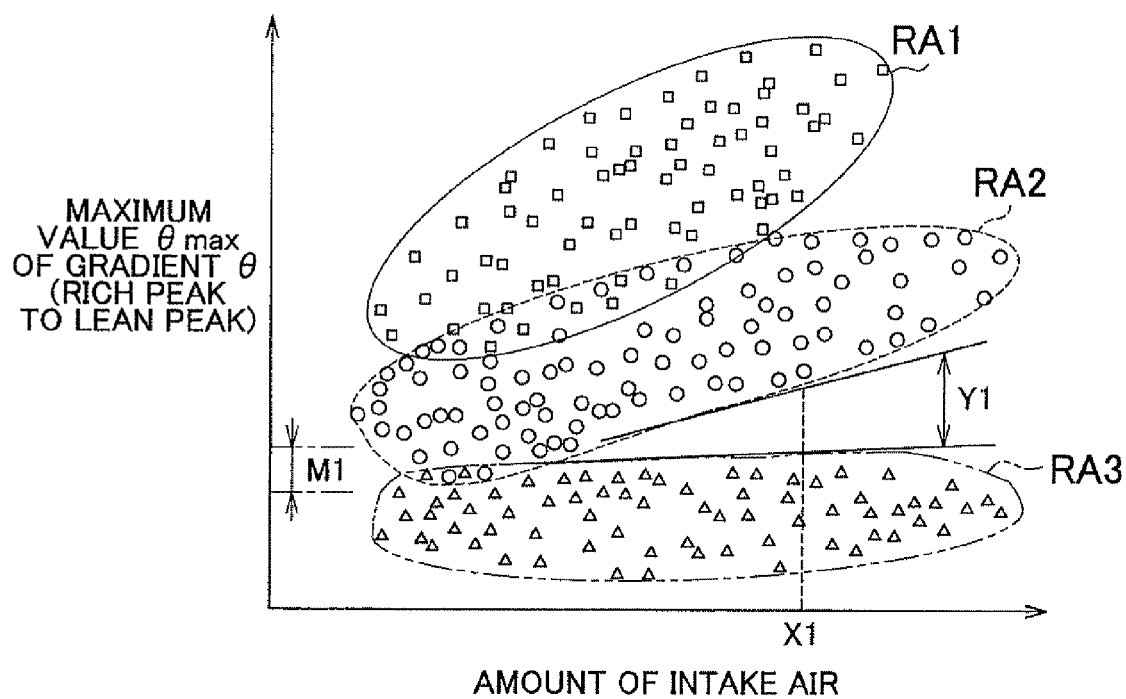
FIG. 5 is a distribution diagram showing the distribution of the maximum value θmax of the gradient θ acquired as data of the responsiveness parameter when the output of the air/fuel ratio sensor changes from a rich peak to a lean peak during the active air/fuel ratio control in embodiments of the invention.

FIG. 5 shows the distribution of the maximum values θmax acquired as data of the responsiveness parameter when the output VAF of the air/fuel ratio sensor 26 changes from the rich peak to the lean peak. In the diagram of FIG. 5, a symbol "⊛" indicates the data acquired when the air/fuel ratio sensor 26 is normal, and a symbol "○" indicates the data acquired when the air/fuel ratio sensor 26 is normal but in an lower-limit permissible state in conjunction with abnormality, and a symbol "△" indicates data acquired when the air/fuel ratio sensor 26 is in an abnormal state due to degradation or the like of the air/fuel ratio sensor 26.

A region RA1 in which data indicated by "⊛" are distributed is located above (in the diagram) a region RA2 in which data indicated by "○" are distributed, and the region RA2 is located above (in the diagram) a region RA3 in which data indicated by the "△" are distributed. This data distribution results because if the air/fuel ratio sensor 26 has abnormality such as degradation or the like, the responsiveness of the output VAF of the air/fuel ratio sensor 26 during the active air/fuel ratio control deteriorates as shown by a dashed two-dotted line in the time chart of the output VAF of the air/fuel ratio sensor 26 shown in FIG. 3 from a normal state (shown by a solid line in the time chart), and the influence thereof appears in the distribution of data in FIG. 5. Besides, the regions RA1, RA2 and RA3 are displaced upward in the diagram to an extent that is greater the greater the intake air amount of the engine 1. The degree of upward displacement of the regions in the diagram relative to the increase in the intake air amount becomes larger in the order of the region RA3, the region RA2 and the region RA1. This is because as the intake air amount of the engine 1 increases, the exhaust gas pressure of the engine 1 (that corresponds to the amount of flow of exhaust gas) rises, and the responsiveness of the output VAF of the air/fuel ratio sensor 26 to the change in the actual air/fuel ratio of the engine 1 improves, and because the improvement in the responsiveness is large when the air/fuel ratio sensor 26 is normal, and is small when the air/fuel ratio sensor 26 is abnormal.

As can be seen from FIG. 5, when the engine 1 is in the small-amount-of-intake-air state, the region RA2 and the region RA3 overlap with each other. The region RA2 and the region RA3 overlapping with each other in this manner means that in and around the overlapping area, the difference made by the presence/absence of abnormality of the air/fuel ratio sensor 26 less clearly appears in the responsiveness parameter (maximum value θmax). Incidentally, the foregoing overlap between the region RA2 and the region RA3 occurs because the requirement for betterment of the exhaust emission of the engine 1 has been made severer and the air/fuel ratio sensor 26, if failing to meet the requirement, is regarded as being abnormal, so that the region RA2 and the region RA3 become closer to each other in the vertical direction in FIG. 5.

Figure 6:
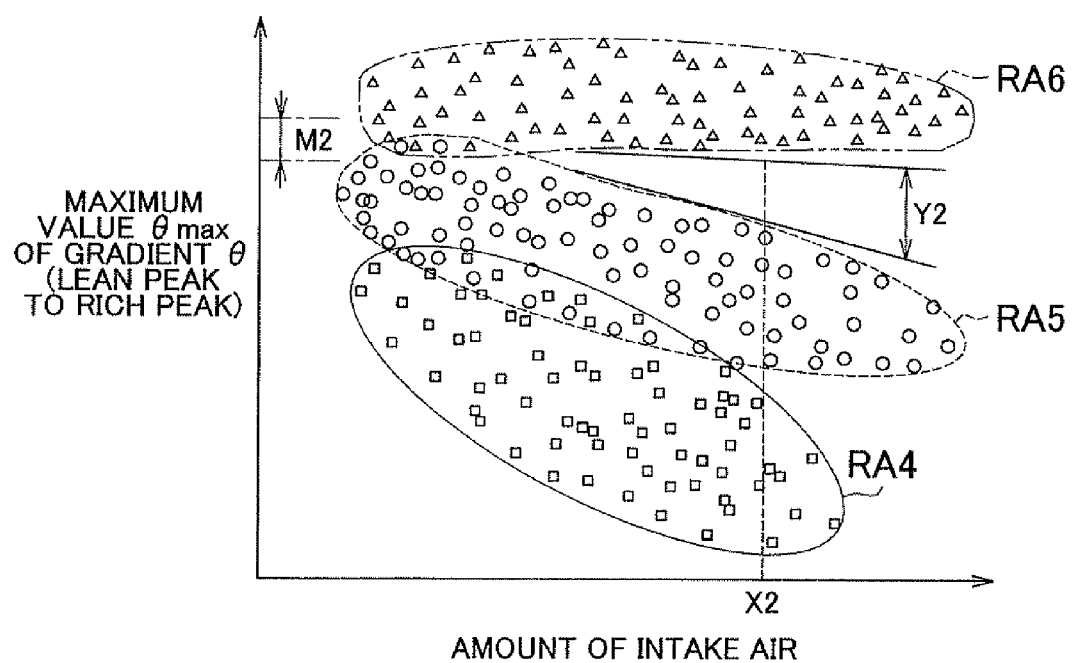
FIG. 6 is a distribution diagram showing the distribution of the maximum value θmax of the gradient θ acquired as data of the responsiveness parameter when the output of the air/fuel ratio sensor changes from the lean peak to the rich peak during the active air/fuel ratio control in embodiments of the invention.

FIG. 6 is a diagram showing the distribution of the maximum values θmax that are acquired as data for the responsiveness parameter when the output VAF of the air/fuel ratio sensor 26 changes from the lean peak to the rich peak. Incidentally, in this diagram of FIG. 6, a symbol "⊚" indicates the data acquired when the air/fuel ratio sensor 26 is normal, and a symbol "○" indicates the data acquired when the air/fuel ratio sensor 26 is normal but in an lower-limit permissible state in conjunction with abnormality, and a symbol "Δ" indicates data acquired when the air/fuel ratio sensor 26 is in an abnormal state of the air/fuel ratio sensor 26, as in FIG. 5.

A region RA4 in which data indicated by "⊚" are distributed is located below (in the diagram) a region RA5 in which data indicated by "○" are distributed, and the region RA5 is located below (in the diagram) a region RA6 in which data indicated by the "Δ" are distributed. This data distribution results because if the air/fuel ratio sensor 26 has abnormality such as degradation or the like, the responsiveness of the output VAF of the air/fuel ratio sensor 26 during the active air/fuel ratio control deteriorates as shown by the dashed two-dotted line in the time chart of the output VAF of the air/fuel ratio sensor 26 shown in FIG. 3 from a normal state (shown by the solid line in the time chart), and the influence thereof appears in the distribution of data in FIG. 6. Besides, the regions RA4, RA5 and RA6 are displaced downward in the diagram to an extent that is greater the greater the intake air amount of the engine 1. The degree of downward displacement of the regions in the diagram relative to the increase in the intake air amount becomes larger in the order of the region RA6, the region RA5 and the region RA4. This is because as the intake air amount of the engine 1 increases, the exhaust gas pressure of the engine 1 (that corresponds to the amount of flow of exhaust gas) rises, and the responsiveness of the output VAF of the air/fuel ratio sensor 26 to the change in the actual air/fuel ratio of the engine 1 improves, and because the improvement in the responsiveness is large when the air/fuel ratio sensor 26 is normal, and is small when the air/fuel ratio sensor 26 is abnormal.

As can be seen from FIG. 6, when the engine 1 is in the small-amount-of-intake-air state, the region RA5 and the region RA6 overlap with each other. The region RA5 and the region RA6 overlapping with each other in this manner means that in and around the overlapping area, the difference made by the presence/absence of abnormality of the air/fuel ratio sensor 26 less clearly appears in the responsiveness parameter (maximum value θmax). Incidentally, the foregoing overlap between the region RA5 and the region RA6 occurs because the requirement for betterment of the exhaust emission of the engine 1 has been made severer and the air/fuel ratio sensor 26, if failing to meet the requirement, is regarded as being abnormal, so that the region RA5 and the region RA6 become closer to each other in the vertical direction in FIG. 6.

Next, the process "c" (S105 to S109) will be described. Step S105 (FIG. 4) is a process for determining the presence/absence of abnormality of the air/fuel ratio sensor 26 when the output VAF of the air/fuel ratio sensor 26 changes from the rich state to the lean state (hereinafter, referred to as "first determination process"). The first determination process uses the data (maximum values θmax) acquired when the output VAF of the air/fuel ratio sensor 26 changes from the rich peak to the lean peak during the active air/fuel ratio control.

Specifically, the number N1 of acquisitions of the foregoing data performed after the active air/fuel ratio control has started is counted. Then, among the number N1 of acquisitions of data, the number N1b of acquisitions of data during the large-amount-of-intake-air state of the engine 1 is counted. Then, when the number N1 of acquisitions is greater than or equal to a first set number S, an average value AV1 of the data acquired by the first set number S of acquisitions is found, and an average value GAav1 of the intake air amounts obtained at the times of the acquisitions of the data is found. If at least one of the average value AV1 and the average value GAav1 that are found in the foregoing manners is not in such a pending region M1 that the difference made by the presence/absence of abnormality of the air/fuel ratio sensor 26 is less likely to appear in the responsiveness parameter (maximum value θmax), the determination as to the presence/absence of abnormality of the air/fuel ratio sensor 26 based on comparison between the average value AV1 of the data and an abnormality criterion value H1 is performed. That is, if the average value AV1 is apart from the abnormality criterion value H1 in a negative direction therefrom, it is determined that the air/fuel ratio sensor 26 has abnormality. If not, it is determined that the air/fuel ratio sensor 26 is normal.

The pending region M1 is a region that is lotted on the basis of the responsiveness parameter (maximum value θmax) and the intake air amount of the engine 1, and is defined, for example, as follows on the basis of FIG. 5. In FIG. 5, since a region containing the overlap portion between the region RA2 and the region RA3 and its vicinity is a region in which the difference made by the presence/absence of abnormality of the air/fuel ratio sensor 26 is less likely to appear in the responsiveness parameter (maximum value θmax), a range of the responsiveness parameter corresponding to the overlapping portion and its vicinity is set as the pending region M1. Besides, since the region RA2 and the region RA3 overlap with each other when the engine 1 is in the small-amount-of-intake-air state, a range that causes the intake air amount of the engine 1 to be, for example, less than a predetermined value X1, is set as the pending region M1. Incidentally, the foregoing predetermined value X1 used in the embodiment is a value that is determined by experiments or the like beforehand as an optimal value in terms of prescribing the pending region M1.

On the other hand, if both the average value AV1 of the data acquired by the first set number S of acquisitions and the average value GAav1 of the intake air amounts obtained at the times of the acquisitions of the data are in the pending region M1 while the number N1 of acquisitions of data is greater than or equal to the first set number S, the acquisition of data is performed until the number N1b of acquisitions of data performed when the amount of intake air of the engine 1 is large reaches a second set number T (<S). Then, after data has been acquired the second set number T of times, an average value AV1 of only those data is found, and the determination as to the presence/absence of abnormality of the air/fuel ratio sensor 26 based on comparison between the average value AV1 and the abnormality criterion value H1 is performed. That is, similarly to what has been described above, if the average value AV1 is apart from the abnormality criterion value H1 in the negative direction therefrom, it is determined that the air/fuel ratio sensor 26 has abnormality. If not, it is determined that the air/fuel ratio sensor 26 is normal.

Step S106 (FIG. 4) is a process for determining whether or not there is abnormality of air/fuel ratio sensor 26 when the output VAF of the air/fuel ratio sensor 26 changes from the lean state to the rich state (hereinafter, referred to as "second determination process"). This second determination process uses the data (maximum values θmax) acquired when the output VAF of the air/fuel ratio sensor 26 changes from the lean peak to the rich peak during the active air/fuel ratio control.

Specifically, the number N2 of acquisitions of the data performed after the execution of the active air/fuel ratio control has started is counted. Among the number N2 of acquisitions of data, the number N2b of acquisitions of data during the large-amount-of-intake-air state of the engine 1 is counted. Then, when the number N2 of acquisitions is greater than or equal to the first set number S, an average value AV2 of the data acquired by the first set number S of acquisitions is found, and an average value GAav2 of the intake air amounts obtained at the times of the acquisitions of data is found. If at least one of the average value AV2 and the average value GAav2 that are found in the foregoing manners is not in such a pending region M2 that the difference made by the presence/absence of abnormality of the air/fuel ratio sensor 26 is less likely to appear in the responsiveness parameter (maximum value θmax), the determination as to the presence/absence of abnormality of the air/fuel ratio sensor 26 based on comparison between the average value AV2 of the data and an abnormality criterion value H2 is performed. That is, if the average value AV2 is apart from the abnormality criterion value H2 in the positive direction therefrom, it is determined that the air/fuel ratio sensor 26 has abnormality. If not, it is determined that the air/fuel ratio sensor 26 is normal.

The pending region M2 is a region that is lotted on the basis of the responsiveness parameter (maximum value θmax) and the intake air amount of the engine 1, and is defined, for example, as follows on the basis of FIG. 6. In FIG. 6, since a region containing the overlap portion between the region RA5 and the region RA6 and its vicinity is a region in which the difference made by the presence/absence of abnormality of the air/fuel ratio sensor 26 is less likely to appear in the responsiveness parameter (maximum value θmax), a range of the responsiveness parameter corresponding to the overlapping portion and its vicinity is set as the pending region M2. Besides, since the region RA5 and the region RA6 overlap with each other when the engine 1 is in the small-amount-of-intake-air state, a range that causes the intake air amount of the engine 1 to be, for example, less than a predetermined value X2, is set as the pending region M2. Incidentally, the foregoing predetermined value X2 used in the embodiment is a value that is defined by experiments or the like beforehand as an optimal value in terms of prescribing the pending region M2.

On the other hand, if both the average value AV2 of the data acquired by the first set number S of acquisitions and the average value GAav2 of the intake air amounts obtained at the times of the acquisitions of the data are in the pending region M2 while the number N2 of acquisitions of data is greater than or equal to the first set number S, the acquisition of data is performed until the number N2b of acquisitions of data performed when the amount of intake air of the engine 1 is large reaches the second set number T. Then, after data has been acquired the second set number T of times, an average value AV2 of only those data is found, and the determination as to the presence/absence of abnormality of the air/fuel ratio sensor 26 based on comparison between the average value AV2 and the abnormality criterion value H2 is performed. That is, similarly to what has been described above, if the average value AV2 is apart from the abnormality criterion value H2 in the negative direction therefrom, it is determined that the air/fuel ratio sensor 26 has abnormality. If not, it is determined that the air/fuel ratio sensor 26 is normal.

After the determination as to the presence/absence of abnormality of the air/fuel ratio sensor 26 during the change of the output VAF of the air/fuel ratio sensor 26 from the rich state to the lean state ends (YES in S107 in FIG. 4) and the determination as to the presence/absence of abnormality of the air/fuel ratio sensor 26 during the change of the output VAF of the air/fuel ratio sensor 26 from the lean state to the rich state (YES in S108), the active air/fuel ratio control is stopped (S109).

In the abnormality detection process based on the foregoing procedure "a" to "c", if at least one of the average value AV1 or AV2 of the data acquired by the first set number S of acquisitions and the average value GAav1 or GAav2 of the intake air amounts obtained at the times of the acquisitions of data is not in the pending region M1 or M2, respectively, the following can be said about the determination as to the presence/absence of abnormality of the air/fuel ratio sensor 26. That is, it becomes possible to accurately perform the determination as to the presence/absence of abnormality of the air/fuel ratio sensor 26 based on comparison between the average value AV1 or AV2 and the abnormality criterion value H1 or H2, respectively. Hence, in this case, the determination as to the presence/absence of abnormality of the air/fuel ratio sensor 26 based on comparison between the average values AV1 and AV2 and the abnormality criterion values H1 and H2, respectively, is promptly performed. Therefore, the determination as to the presence/absence of abnormality can be performed earlier and the decrease of the opportunities of executing the determination can be restrained. Furthermore, in conjunction with the execution of the determination as to the presence/absence of abnormality of the air/fuel ratio sensor 26 based on the procedure "a" to "c", a condition that the engine 1 be in the large-amount-of-intake-air state, or the like is not set as an condition for the execution of the determination. Therefore, the decrease of the opportunities of executing the determination as to the presence/absence of abnormality of the air/fuel ratio sensor 26 by an amount of decrease that corresponds to the setting of the condition can be restrained.

On the other hand, if both the average value AV1 or AV2 of the data acquired by the first set number S of acquisitions and the average value GAav1 or GAav2 of the intake air amounts obtained at the times of the acquisitions of data are in the pending region M1 or M2, respectively, the acquisition of data is performed until the number of acquisitions (number N1b or N2b of acquisitions) of data performed when the amount of intake air of the engine 1 is large reaches the second set number T. Then, the presence/absence of abnormality of the air/fuel ratio sensor 26 is determined on the basis of comparison between the average value AV1 or AV2 of only the data acquired by the second set number T of acquisitions and the abnormality criterion value H1 or H2, respectively. Incidentally, the data acquired during the large-amount-of-intake-air state of the engine 1 is highly-reliable data that precisely represents the influence of occurrence of abnormality of the air/fuel ratio sensor 26 if any occurs. This is because during the large-amount-of-intake-air state of the engine 1, the amount of flow of exhaust gas also becomes large due to the large amount of intake air, and because the influence of the abnormality of the air/fuel ratio sensor 26 more easily appears in the output of the air/fuel ratio sensor 26. Since the average values AV1 and AV2 are found using the highly reliable data, the determination as to the presence/absence of abnormality of the air/fuel ratio sensor 26 based on comparison between the average value AV1 or AV2 and the abnormality criterion value H1 or H2 becomes accurate.

However, with regard to execution of the determination as to the presence/absence of abnormality of the air/fuel ratio sensor 26, it is a required condition that the number of acquisitions of data performed when the amount of intake air of the engine 1 is large be greater than or equal to the second set number T. Although this condition is an execution condition for executing the determination as to the presence/absence of abnormality of the air/fuel ratio sensor 26, the opportunities of executing the determination in this case increase, in comparison with the case where the determination as to the presence/absence of abnormality of the air/fuel ratio sensor 26 based on the procedure "a" to "c" is executed by using an execution condition that the engine 1 be in the large-amount-of-intake-air state or the like. Furthermore, the condition that the number of acquisitions of data performed during the time of large amount of intake air of the engine 1 be greater than or equal to the second set number T is used as an execution condition for the determination as to the presence/absence of abnormality of the air/fuel ratio sensor 26, only in cases as follows. That is, the foregoing condition is used as an execution condition for the determination only when both the average value AV1 or AV2 of the data acquired by the first set number S of acquisitions which is found when the number N1 of acquisitions of data reaches the first set number S, and the average value GAav1 or GAav2 of the intake air amounts obtained at the times of the acquisitions of data are in the pending region M1 or M2. Therefore, the decrease of the opportunities of executing the determination as to the presence/absence of abnormality of the air/fuel ratio sensor 26 by an amount of decrease that corresponds to the foregoing condition can be minimized.

Figure 7:
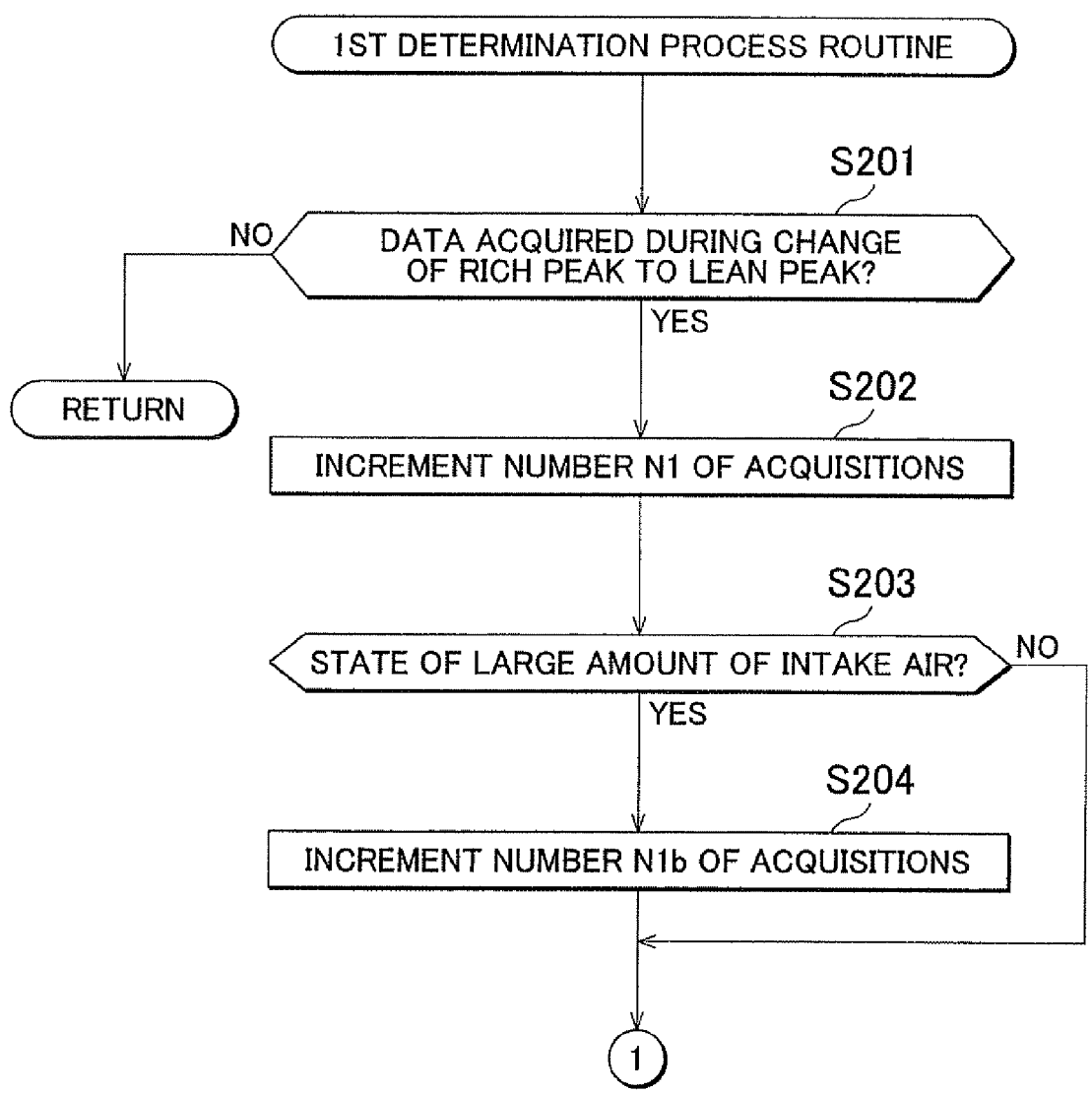
FIG. 7 is a flowchart showing an execution procedure of a first determination process in an embodiment of the invention.
Figure 8:
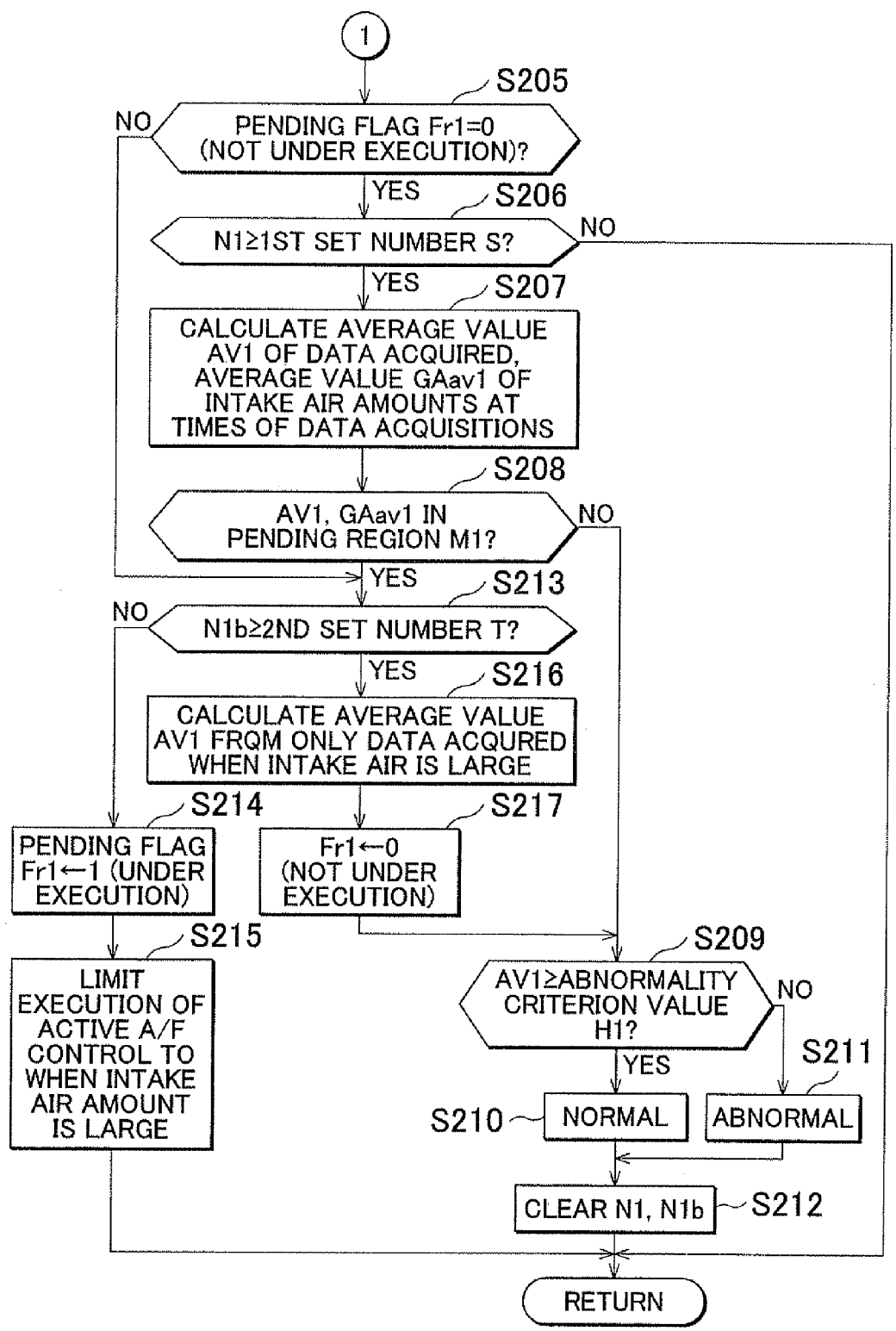
FIG. 8 is a flowchart showing the execution procedure of the first determination process in the embodiment of the invention.

Next, a detailed procedure for execution of the first determination process that is performed in step S105 in the abnormality detection routine will be described with reference to a flowchart of FIGS. 7 and 8 which shows a first determination process routine. This first determination process routine is executed every time the process proceeds to step S105 in the abnormality detection routine.

In the first determination process routine, after the change of the output VAF of the air/fuel ratio sensor 26 from the rich peak to the lean peak is completed and the acquisition of data (maximum value θmax) regarding the change from the rich peak to the lean peak is performed (YES in S201 of FIG. 7), the number N1 of acquisitions is incremented by "1" (S202). After that, in order to determine whether or not the foregoing acquisition of data is the acquisition performed during the large-amount-of-intake-air state of the engine 1, it is determined whether or not the engine 1 is in the large-amount-of-intake-air state (S203), that is, it is determined whether or not the intake air amount of the engine 1 is greater than or equal to a predetermined value X1.

It is to be noted herein that as shown in FIG. 5, the smaller the intake air amount of the engine 1, the closer the region RA2 and the region RA3 are to each other in the vertical direction in the diagram of FIG. 5, and the smaller the distance between the region RA2 and the region RA3 in the vertical direction in the diagram of FIG. 5 (the length of an arrowed line Y1). This means that when the intake air amount of the engine 1 is small, the foregoing data (maximum value θmax) comes to less clearly show a difference according to the presence/absence of abnormality of the air/fuel ratio sensor 26, and that the larger the intake air amount of the engine 1, the more conspicuously the data shows a difference according to the presence/absence of abnormality of the air/fuel ratio sensor 26. Incidentally, since the predetermined value X1 used in the embodiment is a value that is determined beforehand by experiments or the like as an optimal value in terms of prescribing the pending region M1, the predetermined value X1 is such a value that the affirmative determination in the step S203 can represent that the amount of intake air of the engine 1 is an amount of intake air that causes the data to conspicuously represent the difference made by the presence/absence of abnormality of the air/fuel ratio sensor 26.

If an affirmative determination is made in step S203 (FIG. 7), it is determined that the foregoing acquisition of data is the acquisition performed during the large-amount-of-intake-air state of the engine 1, and the number N1b of acquisitions of data performed during the large-amount-of-intake-air state of the engine 1 is incremented by "1" (S204). On the other hand, if a negative determination is made in step S203, it is determined that the foregoing acquisition of data is not the acquisition performed during the large-amount-of-intake-air state of the engine 1, and the number N1b of acquisitions is not incremented. Therefore, the number N1b of acquisitions, of the number N1 of acquisitions, represents the number of times the acquisition of data has been performed during a state in which the intake air amount of the engine 1 is such a large amount that the data acquired during the state conspicuously shows an influence caused by the presence/absence of abnormality of the air/fuel ratio sensor 26.

Subsequently, it is determined whether or not a pending flag Fr1 for use in determining whether or not the process for causing the number N1b of acquisitions of data during the large-amount-of-intake-air state of the engine 1 to be greater than or equal to the second set number T is being executed is "0 (not under execution)" (S205 in FIG. 8). For example, in the case where the process proceeds step S205 for the first time after the engine 1 is started, an affirmative determination is made in this step. If an affirmative determination is made in step S205, it is then determined whether or not the number N1 of acquisitions has reached the first set number S (e.g., five) (S206). Then, if the number N1 of acquisitions is greater than or equal to the first set number S, calculation of the average value AV1 of the data acquired by the number N1 of acquisitions, and calculation of the average value GAav1 of the intake air amounts obtained at the times of the acquisitions of data are performed (S207). If at least one of the average value AV1 and the average value GAav1 is not in the pending region M1 (NO in S208), the determination as to the presence/absence of abnormality of the air/fuel ratio sensor 26 based on comparison between the average value AV1 and the abnormality criterion value H1 is performed (S209).

Specifically, if the average value AV1 is greater than or equal to the abnormality criterion value H1 (YES in S209), it is determined that the air/fuel ratio sensor 26 does not have abnormality during the change of the output VAF of the air/fuel ratio sensor 26 from the rich state to the lean state, and therefore that the air/fuel ratio sensor 26 is normal (S210). Besides, if the average value AV1 is less than abnormality criterion value H1 (NO in S209), it is determined that the air/fuel ratio sensor 26 has abnormality during the change of the output VAF of the air/fuel ratio sensor 26 from the rich state to the lean state (S211). After it is determined that the air/fuel ratio sensor 26 is normal or abnormal (S210 or S211), the numbers N1 and N1b of acquisitions are cleared to "0" (S212). Incidentally, the abnormality criterion value H1 adopted herein is a value that is determined beforehand through experiments or the like so as to be appropriate for determining the presence/absence of abnormality of the air/fuel ratio sensor 26.

On the other hand, if both the average value AV1 and the average value GAav1 calculate din step S207 are in the pending region M1 (YES in S208), it is then determined whether or not the number N1b of acquisitions has reached the second set number T (e.g., one) that is smaller than the first set number S (S213). If a negative determination is made in this step, the pending flag Fr1 is set to "1 (under execution" (S214), and the acquisition of data is continued until the number N1b of acquisitions becomes equal to the second set number T. Incidentally, while the pending flag Fr1 is set at "1", a negative determination is made in step S205, and the process of step S206 to S208 is skipped. Besides, when the acquisition of data is performed until the number N1b of acquisitions becomes equal to the second set number T, the active air/fuel ratio control for acquiring the data is executed only during the large-amount-of-intake-air state of the engine 1 (S215). Specifically, a condition that the amount of intake air of the engine 1 be greater than or equal to the predetermined value X1 is added to the diagnosis condition of step S101 in the abnormality detection routine shown in FIG. 4, and satisfaction of this condition is used as a requirement for satisfying the diagnosis condition.

Then, when the number N1b of acquisitions reaches the second set number T as the acquisition of data is continued as described above, an affirmative determination is made in step S213, and then the average value AV1 of only the data acquired by the second set number T of acquisitions is calculated (S216). The average value AV1 calculated in this manner is the average value of only the data acquired during the large-amount-of-intake-air state of the engine 1. After the average value AV1 is calculated, the pending flag Fr1 is set to "0 (not under execution)" (S217), and the determination as to the presence/absence of abnormality of the air/fuel ratio sensor 26 based on comparison between the average value AV1 and the abnormality criterion value H1 is performed (S209 to S211), and the numbers N1 and N1b of acquisitions are cleared (S212).

Figure 9:
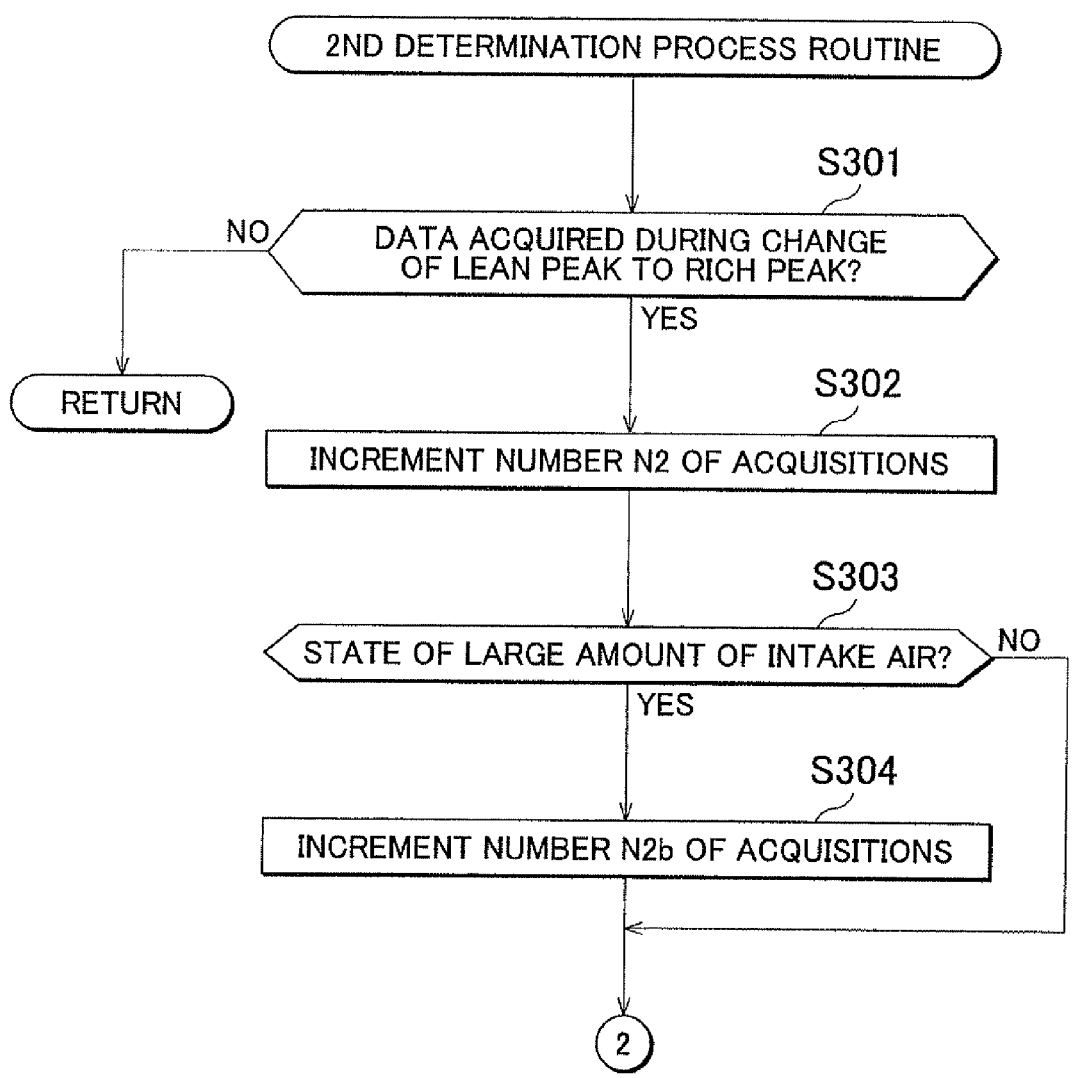
FIG. 9 is a flowchart showing an execution procedure of a second determination process in an embodiment of the invention.
Figure 10:
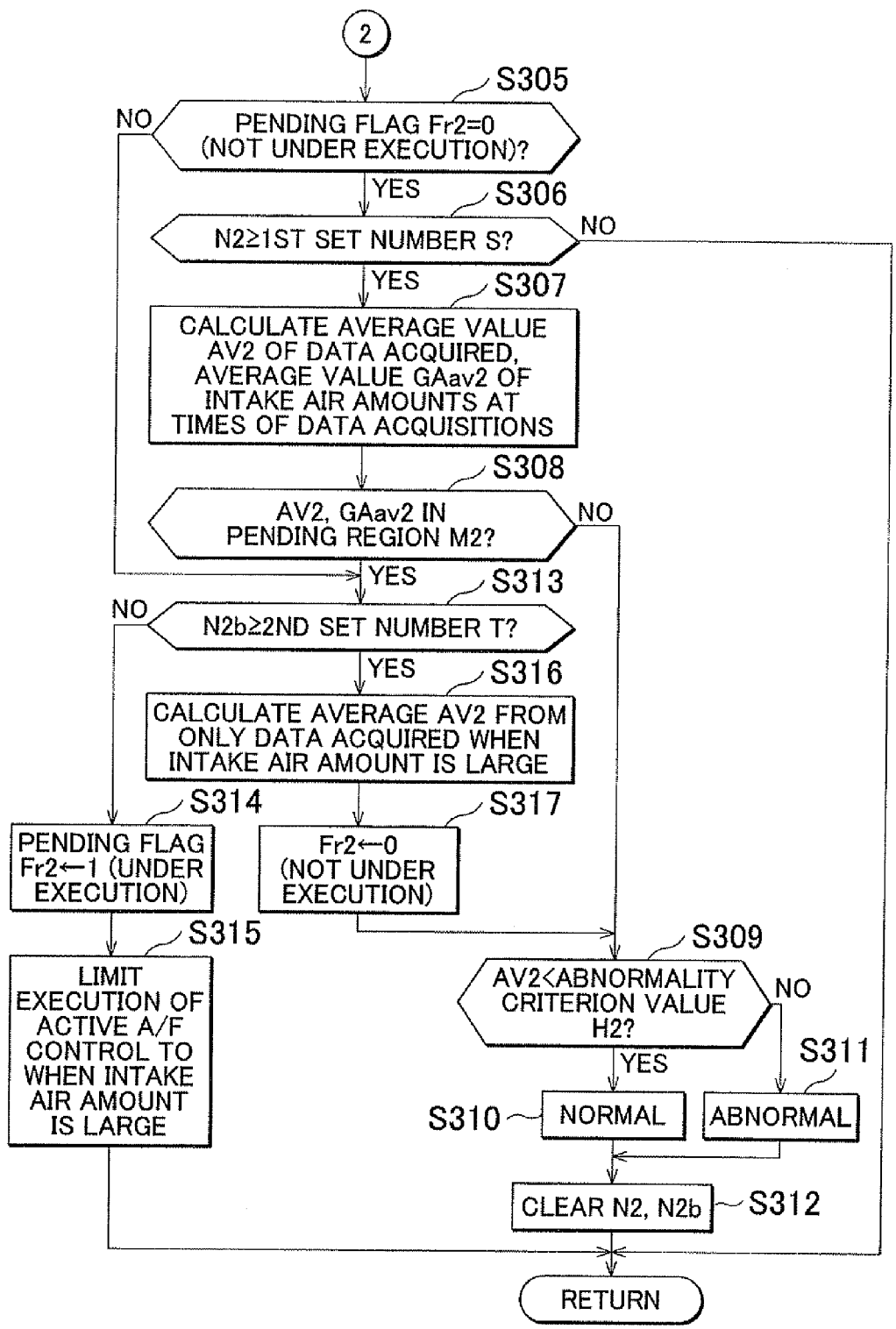
FIG. 10 is a flowchart showing the execution procedure of the second determination process in the embodiment of the invention.

Next, the execution procedure for the second determination process performed in the step S106 in the abnormality detection routine (FIG. 4) will be described in detail with reference to the flowchart of FIGS. 9 and 10 showing the second determination process routine. This second determination process routine is executed every time the process proceeds to step S106 in the abnormality detection routine.

In the second determination process routine, after the change of the output VAF of the air/fuel ratio sensor 26 from the lean peak to the rich peak is completed and the acquisition of data (maximum value θmax) regarding the change from the lean peak to the rich peak is performed (YES in S301 of FIG. 9), the number N2 of acquisitions is incremented by "1" (S302). After that, in order to determine whether or not the foregoing acquisition of data is the acquisition performed during the large-amount-of-intake-air state of the engine 1, it is determined whether or not the engine 1 is in the large-amount-of-intake-air state (S303), that is, it is determined whether or not the intake air amount of the engine 1 is greater than or equal to a predetermined value X2.

It is to be noted herein that as shown in FIG. 6, the smaller the intake air amount of the engine 1, the closer the region RA5 and the region RA6 are to each other in the vertical direction in the diagram of FIG. 6, and the smaller the distance between the region RA5 and the region RA6 in the vertical direction in the diagram of FIG. 6 (the length of an arrowed line Y2). This means that when the intake air amount of the engine 1 is small, the foregoing data (maximum value θmax) comes to less clearly show a difference according to the presence/absence of abnormality of the air/fuel ratio sensor 26, and that the larger the intake air amount of the engine 1, the more conspicuously the data shows a difference according to the presence/absence of abnormality of the air/fuel ratio sensor 26. Incidentally, since the predetermined value X2 used in the embodiment is a value that is determined beforehand by experiments or the like as an optimal value in terms of prescribing the pending region M2, the predetermined value X2 is such a value that the affirmative determination in the step S303 can represent that the amount of intake air of the engine 1 is an amount of intake air that causes the data to conspicuously represent the difference made by the presence/absence of abnormality of the air/fuel ratio sensor 26.

If an affirmative determination is made in step S303 (FIG. 9), it is determined that the foregoing acquisition of data is the acquisition performed during the large-amount-of-intake-air state of the engine 1, and the number N2b of acquisitions of the data performed during the large-amount-of-intake-air state of the engine 1 is incremented by "1" (S304). On the other hand, if a negative determination is made in step S303, it is determined that the foregoing acquisition of data is not the acquisition performed during the large-amount-of-intake-air state of the engine 1, and the number N2b of acquisitions is not incremented. Therefore, the number N2b of acquisitions, of the number N2 of acquisitions, represents the number of times the acquisition of data has been performed during a state in which the intake air amount of the engine 1 is such a large amount that the data acquired during the state conspicuously shows an influence caused by the presence/absence of abnormality of the air/fuel ratio sensor 26.

Subsequently, it is determined whether or not a pending flag Fr2 for use in determining whether or not the process for causing the number N2b of acquisitions of data during the large-amount-of-intake-air state of the engine 1 to be greater than or equal to the second set number T is being executed is "0 (not under execution)" (S305 in FIG. 9). For example, in the case where the process proceeds step S305 for the first time after the engine 1 is started, an affirmative determination is made in this step. If an affirmative determination is made in step S305, it is then determined whether or not the number N2 of acquisitions has reached the first set number S (S306). Then, if the number N2 of acquisitions is greater than or equal to the first set number S, calculation of the average value AV2 of the data acquired by the number N2 of acquisitions, and calculation of the average value GAav2 of the intake air amounts obtained at the times of the acquisitions of data are performed (S307). If at least one of the average value AV2 and the average value GAav2 is not in the pending region M2 (NO in S308), the determination as to the presence/absence of abnormality of the air/fuel ratio sensor 26 based on comparison between the average value AV2 and the abnormality criterion value H2 is performed (S309).

Specifically, if the average value AV2 is less than the abnormality criterion value H2 (YES in S309), it is determined that the air/fuel ratio sensor 26 does not have abnormality during the change of the output VAF of the air/fuel ratio sensor 26 from the lean state to the rich state, and therefore that the air/fuel ratio sensor 26 is normal (S310). Besides, if the average value AV2 is greater than or equal to abnormality criterion value H2 (NO in S309), it is determined that the air/fuel ratio sensor 26 has abnormality during the change of the output VAF of the air/fuel ratio sensor 26 from the lean state to the rich state (S311). After it is determined that the air/fuel ratio sensor 26 is normal or abnormal (S310 or S311), the numbers N2 and N2b of acquisitions are cleared to "0" (S312). Incidentally, the abnormality criterion value H2 adopted herein is a value that is determined beforehand through experiments or the like so as to be appropriate for determining the presence/absence of abnormality of the air/fuel ratio sensor 26.

On the other hand, if both the average value AV2 and the average value GAav2 calculate din step S307 are in the pending region M2 (YES in S308), it is then determined whether or not the number N2b of acquisitions has reached the second set number T (S313). If a negative determination is made in this step, the pending flag Fr2 is set to "1 (under execution" (S314), and the acquisition of data is continued until the number N2b of acquisitions becomes equal to the second set number T. Incidentally, while the pending flag Fr2 is set at "1", a negative determination is made in step S305, and the process of step S306 to S308 is skipped. Besides, when the acquisition of data is performed until the number N2b of acquisitions becomes equal to the second set number T, the active air/fuel ratio control for acquiring the data is executed only during the large-amount-of-intake-air state of the engine 1 (S315). Specifically, a condition that the amount of intake air of the engine 1 be greater than or equal to the predetermined value X2 is added to the diagnosis condition of step S101 in the abnormality detection routine shown in FIG. 4, and satisfaction of this condition is used as a requirement for satisfying the diagnosis condition.

Then, when the number N2b of acquisitions reaches the second set number T as the acquisition of data is continued as described above, an affirmative determination is made in step S313, and then the average value AV2 of only the data acquired by the second set number T of acquisitions is calculated (S316). The average value AV2 calculated in this manner is the average value of only the data acquired during the large-amount-of-intake-air state of the engine 1. After the average value AV2 is calculated, the pending flag Fr2 is set to "0 (not under execution)" (S317), and the determination as to the presence/absence of abnormality of the air/fuel ratio sensor 26 based on comparison between the average value AV2 and the abnormality criterion value H2 is performed (S309 to S311), and the numbers N2 and N2b of acquisitions are cleared (S312).

According to the embodiment described above in detail, the following effects are obtained. A first effect will be described. In the abnormality detection process based on the procedure "a" to "c", when the number N1 or N2 of acquisitions of data reaches the first set number S, it is determined whether or not the average value AV1 or AV2 of the data acquired by the number N1 or N2 of acquisitions and the average value GAav1 or GAav2 of the intake air amounts at the times of the acquisitions of data are in the pending region M1 or M2, respectively. Then, if at least one of the average value AV1 and the average value GAav1 is not in the pending region M1, the accurate determination as to the presence/absence of abnormality of the air/fuel ratio sensor 26 based on comparison between the average value AV1 and the abnormality criterion value H1 is promptly performed. Besides, if at least one of the average value AV2 and the average value GAav2 is not in the pending region M2, the accurate determination as to the presence/absence of abnormality of the air/fuel ratio sensor 26 based on comparison between the average value AV2 and the abnormality criterion value H2 is promptly performed. Due to this, the determination as to the presence/absence of abnormality of the air/fuel ratio sensor 26 can be performed earlier, and the decrease of the opportunities of executing the determination can be restrained. Furthermore, in conjunction with the execution of the determination as to the presence/absence of abnormality of the air/fuel ratio sensor 26 based on the procedure "a" to "c", a condition that the engine 1 be in the large-amount-of-intake-air state, or the like is not set as an execution condition for executing the determination. Therefore, the decrease of the opportunities of executing the determination as to the presence/absence of abnormality of the air/fuel ratio sensor 26 by an amount of decrease that corresponds to the setting of the condition can be restrained.

On the other hand, if both the average value AV1 or AV2 and the average value GAav1 or GAav2 are in the pending region M1 or M2, the acquisition of data is performed until the number N1b or N2b of acquisitions reaches the second set number T. Then, the presence/absence of abnormality of the air/fuel ratio sensor 26 is determined on the basis of comparison between the average value AV1 or AV2 of only the data acquired by the second set number T of acquisitions and the abnormality criterion value H1 or H2, respectively. Incidentally, the data acquired during the large-amount-of-intake-air state of the engine 1 are highly reliable data that precisely represent the influence of occurrence of abnormality of the air/fuel ratio sensor 26 if any occurs. Since the average values AV1 and AV2 are found using the highly reliable data, the determination as to the presence/absence of abnormality of the air/fuel ratio sensor 26 based on comparison between the average value AV1 or AV2 and the abnormality criterion value H1 or H2 becomes accurate. However, with regard to execution of the determination as to the presence/absence of abnormality of the air/fuel ratio sensor 26, it is a required condition that the number of acquisitions (the numbers N1b and N1b of acquisitions) of data performed during the time of large amount of intake air of the engine 1 be greater than or equal to the second set number T. Although this condition is an execution condition for executing the determination as to the presence/absence of abnormality of the air/fuel ratio sensor 26, the opportunities of executing the determination in this case increase, in comparison with the case where the determination as to the presence/absence of abnormality of the air/fuel ratio sensor 26 based on the procedure "a" to "c" is executed by using an execution condition that the engine 1 be in the large-amount-of-intake-air state or the like. Furthermore, the occasion when the condition that the number N1b or N2b of acquisitions be greater than or equal to the second set number T is used as a condition for executing the determination as to the presence/absence of abnormality of the air/fuel ratio sensor 26 is limited to when both the average value AV1 or AV2 of the data acquired by the first set number S of acquisitions which is found when the number N1 of acquisitions of data reaches the first set number S, and the average value GAav1 or GAav2 of the intake air amounts obtained at the times of the acquisitions of data are in the pending region M1 or M2. Therefore, the decrease of the opportunities of executing the determination as to the presence/absence of abnormality of the air/fuel ratio sensor 26 by an amount of decrease that corresponds to the foregoing condition can be minimized.

Due to what has been described above, it becomes possible to restrain the decrease of the opportunities of executing the determination while accurately performing the determination as to the presence/absence of abnormality of the air/fuel ratio sensor 26.

Next, a second effect will be described. If both the average value AV1 or AV2 and the average value GAav1 or GAav2 are in the pending region M1 or M2 when the number N1 or N2 of acquisitions of data becomes equal to or greater than to the first set number S, it is then determined whether or not, of the first set number S of acquisitions of data, the number of acquisitions of data performed during the large-amount-of-intake-air state of the engine 1 (the number N1b or N2b of acquisitions) has reached the second set number T. If the number N1b or N2b of acquisitions has not reached the second set number T, the acquisition of data is continued until the number N1b or N2b of acquisitions reaches the second set number T. After data has been acquired by the second set number T of acquisitions, the determination as to the presence/absence of abnormality of the air/fuel ratio sensor 26 based on comparison between the average value AV1 or AV2 of only the data acquired by the second set number T of acquisitions and the abnormality criterion value H1 or H2 is performed. On the other hand, if the number N1b or N2b of acquisitions has reached the second set number T, the determination as to the presence/absence of abnormality of the air/fuel ratio sensor 26 based on comparison between the average value AV1 or AV2 of only the data acquired by the second set number T of acquisitions and the abnormality criterion value H1 or H2 is immediately performed. Thus, since the determination as to the presence/absence of abnormality of the air/fuel ratio sensor 26 is immediately performed when it is not necessary to perform the second set number T of acquisitions of data, the determination as to the presence/absence of abnormality can be performed earlier.

Next, a third effect will be described. In the case where the acquisition of data is continued in order to acquire data by the second set number T of acquisitions, a condition that the engine 1 be in the large-amount-of-intake-air state, more specifically, a condition that the intake air amount of the engine 1 be greater than or equal to the predetermined value X1 or X2, is added as a condition for executing the active air/fuel ratio control for continuing the acquisition of data. In this case, the active air/fuel ratio control is executed only when the amount of intake air of the engine 1 is large. Due to this, useless execution of the active air/fuel ratio control that does not lead to the acquisition of data performed during the large-amount-of-intake-air state of the engine 1, that is, the second set number T of acquisitions of data, can be restrained.

Next, a fourth effect will be described. Each of the foregoing pending regions M1 and M2 is a region lotted on the basis of the responsiveness parameter (maximum value θmax) and the intake amount of the engine 1. It is to be noted herein that the foregoing responsiveness parameter is more likely to represent a difference made by the presence/absence of abnormality of the air/fuel ratio sensor 26 when the intake amount of the engine 1 is large, specifically, greater than or equal to the predetermined value X1 or X2. Due to this, the pending region M1 or M2 regarding the intake air amount of the engine 1 is set in a region in which the intake air amount of the engine 1 is small, for example, is less than the predetermined value X1 or X2. Due to this, if during the active air/fuel ratio control, the average value GAav1 or GAav2 of the intake air amounts of the engine obtained at the time of each of the first set number S of acquisitions of data is not in the pending region M1 or M2, that means that the responsiveness parameter that is likely to represent a difference made by the presence/absence of abnormality of the air/fuel ratio sensor 26 is acquired as data, and the average value AV1 or AV2 of the acquired data is found. In this situation, it is useless to perform the determination as to the presence/absence of abnormality of the air/fuel ratio sensor 26 based on comparison between the abnormality criterion value H1 or H2 and the average value AV1 or AV2 of only the data acquired by the second set number T of acquisitions performed during the large-amount-of-intake-air state of the engine 1, merely because the average value AV1 or AV2 of the data is in the pending region M1 or M1. Taking this into consideration, even if the average value AV1 or AV2 of the acquired data when the number N1 or N2 of acquisitions of data has become equal to the first set number S, the determination as to the presence/absence of abnormality of the air/fuel ratio sensor 26 based on comparison between the average value AV1 or AV2 and the abnormality criterion value, provided that the average value GAav1 or GAav2 of the intake air amount is not in the pending region M1 or M2. This makes it possible to avoid waste, that is, avoid useless processes of acquiring data by the second set number T of acquisitions during the large-amount-of-intake-air state of the engine 1, and of determining the presence/absence of abnormality of the air/fuel ratio sensor 26 based on comparison between the average value AV1 or AV2 of only the data acquired by the second set number T of acquisitions and the abnormality criterion value H1 or H2, etc.

Next, a fifth effect will be described. In the case where after the number N1 or N2 of acquisitions of data becomes equal to the first set number S, the acquisition of data is continued until the number N1b or N2b of acquisitions becomes equal to the second set number T, the average value AV1 or AV2 is calculated from only the data acquired by the second set number T of acquisitions, and the presence/absence of abnormality of the air/fuel ratio sensor 26 is determined on the basis of comparison between the average value AV1 or AV2 and the abnormality criterion value H1 or H2. It is to be noted herein that the data acquired during the large-amount-of-intake-air state of the engine 1 (the data acquired by the second set number T of acquisitions) are highly reliable data that precisely represent the influence of occurrence of abnormality of the air/fuel ratio sensor 26 if any occurs. This is because during the large-amount-of-intake-air state of the engine 1, the amount of flow of exhaust gas also becomes large due to the large amount of intake air, and because the influence of the abnormality of the air/fuel ratio sensor 26 more easily appears in the output of the air/fuel ratio sensor 26. Since the average values AV1 and AV2 are found using the highly reliable data, the determination as to the presence/absence of abnormality of the air/fuel ratio sensor 26 based on comparison between the average value AV1 or AV2 and the abnormality criterion value H1 or H2 becomes accurate.

Next, a sixth effect will be described. By the first determination process, the presence/absence of abnormality of the air/fuel ratio sensor 26 during the change of the output VAF of the air/fuel ratio sensor 26 from the rich state to the lean state is determined on the basis of comparison between the abnormality criterion value H1 and the average value AV1 of the data acquired regarding the change of the output VAF of the air/fuel ratio sensor 26 from the rich peak to the lean peak. Besides, by the second determination process, the presence/absence of abnormality of the air/fuel ratio sensor 26 during the change of the output VAF of the air/fuel ratio sensor 26 from the lean state to the rich state is determined on the basis of comparison between the abnormality criterion value H2 and the average value AV2 of the data acquired regarding the change of the output VAF of the air/fuel ratio sensor 26 from the lean peak to the rich peak. Therefore, regardless of whether there occurs an abnormality during the change of the output VAF of the air/fuel ratio sensor 26 from the rich state to the lean state or an abnormality during the change of the output VAF from the lean state to the rich state, it is possible to precisely determine that the abnormality is present.

Besides, in the case where only one of the foregoing two kinds of abnormalities has occurred, it is inevitable that when the air/fuel ratio of the engine 1 is controlled to the stoichiometric air/fuel ratio through an air/fuel ratio feedback correction based on the output VAF of the air/fuel ratio sensor 26, the center of the fluctuations of the air/fuel ratio of the engine 1 associated with the control of the engine 1 to the stoichiometric air/fuel ratio deviates from the stoichiometric air/fuel ratio. As a result, it sometimes happens that good performance of exhaust gas purification of the exhaust purification catalyst provided in the exhaust passageway 4 of the engine 1 cannot be maintained and therefore the exhaust gas emission of the engine 1 deteriorates. In the embodiments, however, as described above, even in the case where only one of the two kinds of abnormalities has occurred, it can be determined that abnormality has occurred. Therefore, it is possible to restrain the foregoing deterioration of the exhaust gas emission by coping with the abnormality on the basis of the determination of the occurrence of the abnormality.

Incidentally, the foregoing embodiments may also be modified, for example, in the following manners. Although the determination as to the presence/absence of an abnormality that occurs during the change of the output VAF of the air/fuel ratio sensor 26 from the rich state to the lean state and the determination as to the presence/absence of an abnormality that occurs during the change of the output VAF from the lean state to the rich state are performed separately from each other, it is not altogether necessary to adopt this manner of determination as to the presence/absence of abnormality. For example, the absolute value of the amount of change of the output VAF per unit time during the active air/fuel ratio control may be acquired as data of the responsiveness parameter, and the presence/absence of abnormality of the air/fuel ratio sensor 26 may be determined on the basis of the data. In this case, the presence/absence of abnormality of the air/fuel ratio sensor 26 is determined regardless of the direction of change of the output VAF of the air/fuel ratio sensor 26.

Besides, when the presence/absence of abnormality of the air/fuel ratio sensor 26 is determined by using the average value AV1 or AV2 of only the data acquired by the second set number T of acquisitions, the determination as to the presence/absence of abnormality of the air/fuel ratio sensor 26 may also be performed on the basis of comparison between the average value AV1 or AV2 and an abnormality criterion value H1s or H2s that is prepared for the comparison with the average value separately from the usual abnormality criterion value H1 or H2. In this case, when the average value AV1 is found from only the data acquired by the second set number T of acquisitions, the abnormality criterion value H1 for use in the step S209 (FIG. 8) is replaced by the abnormality criterion value H1s. Besides, when the average value AV2 is found from only the data acquired by the second set number T of acquisitions, the abnormality criterion value H2 for use in step S309 (FIG. 10) is replaced by the abnormality criterion value H2s.

Therefore, even if the average value AV1 or AV2 found from only the data acquired by the second set number T of acquisitions is more reliable than the average value found as usual, it is possible to accordingly change the abnormality criterion value to an appropriate value that corresponds to the average value that is found only from the data acquired when the amount of intake air of the engine 1 is large. Hence, in the case where the average value AV1 or AV2 is found from only the data acquired by the second set number T of acquisitions (the data acquired when the intake air amount of the engine 1 is large), the determination as to the presence/absence of abnormality of the air/fuel ratio sensor 26 based on comparison between the average value AV1 or AV2 and the abnormality criterion value can be even more accurately accomplished.

Besides, the values of the first set number S and the second set number T may also be changed as appropriate. Incidentally, it is preferable that the second set number T be one as in the foregoing embodiments, and it is also possible to set two, three, fourth, etc., as the second set number T.

Besides, a locus length $\Sigma S$ between the rich peak and the lean peak of the output VAF of the air/fuel ratio sensor 26 may also be used as a responsiveness parameter that is found during the active air/fuel ratio control. Incidentally, the locus length $\Sigma S$ is an integrated value of the changes of the output VAF of the air/fuel ratio sensor 26 at every predetermined time between the rich peak and the lean peak of the output VAF of the air/fuel ratio sensor 26. As for the responsiveness parameter, the use of the maximum value $\theta max$ of the gradient $\theta$ as in the foregoing embodiments is more preferable than the use of the locus length $\Sigma S$. This is because, compared with the locus length $\Sigma S$, the maximum value $\theta max$ of the gradient $\theta$ is less subject to the influence caused by the external disturbance, such as change in the accelerator pedal depression amount, or the like, and makes it easier to distinguish normality and abnormality of the air/fuel ratio sensor 26 on the basis of comparison with the abnormality criterion values.

Besides, the prescriptions regarding the intake air amount of the engine 1 in conjunction with the pending regions M1 and M2 may be omitted, and the determination as to whether the average value AV1 or AV2 is in the pending region M1 or M2 may be performed irrespective of the intake air amount. In this case, the process of storing the intake air amount obtained at every one of the first set number S of times of acquiring data, and the processes of calculating the average values GAav1 and GAav2 of the intake air amounts are omitted.

Besides, each of step S215 (FIG. 8) and step S315 (FIG. 10) may also be omitted, so that the condition that the intake air amount of the engine 1 be greater than or equal to the predetermined value X1 or X2 will not be added to the execution condition for executing the active air/fuel ratio control for performing the second set number T of acquisitions of data, that is, the diagnosis condition of step S101 (FIG. 4).

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. An abnormality detection apparatus for an air/fuel ratio sensor that outputs a signal that corresponds to air/fuel ratio of an internal combustion engine based on oxygen concentration in exhaust gas of the internal combustion engine, comprising:
    an air/fuel ratio control portion that performs an active air/fuel ratio control of periodically fluctuating the air/fuel ratio of the internal combustion engine between a rich state and a lean state;
    a data acquisition portion that acquires, as data for detecting abnormality, a parameter that corresponds to responsiveness during change of output of the air/fuel ratio sensor between a rich peak and a lean peak during the active air/fuel ratio control performed by the air/fuel ratio control portion; and
    an abnormality determination portion that
    when the number of acquisitions performed by the data acquisition portion becomes equal to or greater than a first set number, if the average value of the data acquired is not in a pending region wherein a difference made by the presence/absence of abnormality of the air/fuel ratio sensor is less likely to appear in the parameter, the abnormality determination portion determines the presence/absence of abnormality of the air/fuel ratio sensor based on comparison between the average value and an abnormality criterion value, and
    when the number of acquisitions performed by the data acquisition portion becomes equal to or greater than the first set number, if the average value of the data acquired is in the pending region, the acquisition of the data is performed by the data acquisition portion until the number of acquisitions of the data performed when intake air amount of the internal combustion engine is larger than a predetermined value reaches a second set number, and the abnormality determination portion determines the presence/absence of abnormality of the air/fuel ratio sensor based on comparison between the average value of the data acquired by the second set number of acquisitions and the abnormality criterion value.

2. The abnormality detection apparatus according to claim 1, wherein:
if the average value of the data acquired is in the pending region when the number of acquisitions of the data becomes equal to or greater than the first set number, a determination of whether, of the first set number of acquisitions of the data, the number of acquisitions of the data performed during a large-amount-of-intake-air state of the internal combustion engine has reached the second set number is performed;
if the number of acquisitions of the data performed during the large-amount-of-intake-air state of the internal combustion engine has reached the second set number, the abnormality determination portion determines the presence/absence of abnormality of the air/fuel ratio sensor based on comparison between the average value of the data acquired by the second set number of acquisitions and the abnormality criterion value; and
if the number of acquisitions of the data performed during the large-amount-of-intake-air state of the internal combustion engine has not reached the second set number, the acquisition of the data is continued until the number of acquisitions reaches the second set number, and then the abnormality determination portion determines the presence/absence of abnormality of the air/fuel ratio sensor based on comparison between the abnormality criterion value and the average value of the data acquired by the second set number of acquisitions.

3. The abnormality detection apparatus according to claim 2, wherein if when the number of acquisitions of the data becomes equal to or greater than the first set number, the average value of the data acquired is in the pending region and, of the first set number of acquisitions of the data, the number of acquisitions of the data performed during the large-amount-of-intake-air state of the internal combustion engine has not reached the second set number, the abnormality detection apparatus performs the active air/fuel ratio control and performs the acquisition of the data during execution of the active air/fuel ratio control when the internal combustion engine is in the large-amount-of-intake-air state.

4. The abnormality detection apparatus according to claim 1, wherein the pending region is a region that is lotted based on the parameter and the intake air amount of the internal combustion engine, and wherein even if the average value of the data acquired is in the pending region when the number of acquisitions of the data becomes equal to or greater than the first set number, the determination as to the presence/absence of abnormality of the air/fuel ratio sensor based on comparison between the average value of the data and the abnormality criterion value is performed provided that when the number of acquisitions of the data becomes equal to or greater than the first set number, an average value of the intake air amounts obtained at times of the acquisitions of the data is not in the pending region.

5. The abnormality detection apparatus according to claim 1, wherein when the presence/absence of abnormality of the air/fuel ratio sensor is to be determined by using the average value of the data acquired by the second set number of acquisitions, the determination as to the presence/absence of abnormality of the air/fuel ratio sensor is performed based on comparison between the average value and a second abnormality criterion value that is prepared separately from the abnormality criterion value.

6. The abnormality detection apparatus according to claim 1, wherein:
the acquisition of the data includes acquisition performed during the change of the output of the air/fuel ratio sensor from the rich peak to the lean peak during the active air/fuel ratio control, and acquisition performed during the change of the output of the air/fuel ratio sensor from the lean peak to the rich peak during the active air/fuel ratio control, and the number of times the data has been acquired during the change from the rich peak to the lean peak and the number of times the data has been acquired during the change from the lean peak to the rich peak are separately counted; and
the determination as to the presence/absence of abnormality of the air/fuel ratio sensor is performed based on comparison between the abnormality criterion value and the average value of the data acquired during the change of the output of the air/fuel ratio sensor from the rich peak to the lean peak during the active air/fuel ratio control, and is also performed based on comparison between the abnormality criterion value and the average value of the data acquired during the change of the output of the air/fuel ratio sensor from the lean peak to the rich peak during the active air/fuel ratio control.

7. An abnormality detection method for an air/fuel ratio sensor that outputs a signal that corresponds to air/fuel ratio of an internal combustion engine based on oxygen concentration in exhaust gas of the internal combustion engine, comprising:
performing an active air/fuel ratio control of periodically fluctuating the air/fuel ratio of the internal combustion engine between a rich state and a lean state;
acquiring, as data for detecting abnormality, a parameter that corresponds to responsiveness during change of output of the air/fuel ratio sensor between a rich peak and a lean peak during the active air/fuel ratio control performed; and
determining presence/absence of abnormality of the air/fuel ratio sensor based on comparison between an average value of the data and an abnormality criterion value, when the number of acquisitions of the data performed becomes equal to or greater than a first set number, if the average value is not in a pending region wherein a difference made by the presence/absence of abnormality of the air/fuel ratio sensor is less likely to appear in the parameter; and
performing the acquisition of the data until the number of acquisitions of the data performed when intake air amount of the internal combustion engine is large reaches a second set number, and determining the presence/absence of abnormality of the air/fuel ratio sensor based on comparison between the average value of the data acquired by the second set number of acquisitions and the abnormality criterion value, when the number of acquisitions of the data performed becomes equal to or greater than the first set number, if the average value is in the pending region.

* * * * *